(12) United States Patent
Nakai

(10) Patent No.: US 7,848,875 B2
(45) Date of Patent: Dec. 7, 2010

(54) ENGINE AUTOMATIC STOP-START CONTROLLER

(75) Inventor: Yasuhiro Nakai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/534,208

(22) Filed: Aug. 3, 2009

(65) Prior Publication Data

US 2010/0042311 A1    Feb. 18, 2010

(30) Foreign Application Priority Data

Aug. 8, 2008    (JP) ............................. 2008-205952

(51) Int. Cl.
*F02N 11/10* (2006.01)
*F02P 5/06* (2006.01)

(52) U.S. Cl. ................... 701/113; 701/111; 123/406.27; 123/406.53; 123/179.3; 123/179.5

(58) Field of Classification Search ................. 701/104, 701/111–113; 123/481, 198 D, 198 DB, 123/179.3, 179.4, 179.5, 406.27, 406.53, 123/406.54

See application file for complete search history.

(56) References Cited

U.S. PATENT DOCUMENTS 7,027,911 B2    4/2006   Nishikawa et al.
7,177,755 B2    2/2007   Nishikawa et al.

FOREIGN PATENT DOCUMENTS

| JP | 2005-264813 | 9/2005 |
|----|-------------|--------|
| JP | 4029474 | 10/2007 |
| JP | 2008-133793 | 6/2008 |
| WO | WO 2010/016201 | 2/2010 |

OTHER PUBLICATIONS

Japanese Office Action dated May 20, 2010, issued in corresponding Japanese Application No. 2008-205952, with English translation.
U.S. Appl. No. 12/536,799, Nakai, filed Aug. 6, 2009.
U.S. Appl. No. 12/535,149, Nakai, filed Aug. 4, 2009.

*Primary Examiner*—Hai H Huynh
(74) *Attorney, Agent, or Firm*—Nixon & Vanderhye PC

(57) ABSTRACT

A first ignition cylinder that performs ignition first is set based on an engine stop position in automatic start. Existence/non-existence of a misfire in the first ignition cylinder is determined based on whether a difference ΔNe between engine rotation speed at a predetermined crank angle in an interval from timing immediately before the ignition to timing immediately after the ignition of the first ignition cylinder (e.g., at TDC of first ignition cylinder) and engine rotation speed at a predetermined crank angle before ignition of a second ignition cylinder (e.g., at TDC of second ignition cylinder) is equal to or smaller than a predetermined misfire determination threshold value Nef. When misfire time number of the first ignition cylinder exceeds a predetermined value, fuel supply to the first ignition cylinder is prohibited and the automatic start is started from the second ignition cylinder.

6 Claims, 17 Drawing Sheets

FIG. 13

FIRST IGNITION CYLINDER MAP (ENGINE= FOUR-CYLINDER ENGINE)

| CRANK ANGLE (degCA) | 0 | 30 | 60 | 90 | 120 | 150 | 180 | 210 | 240 | 270 | 300 | 330 |
|---|---|---|---|---|---|---|---|---|---|---|---|---|
| FIRST IGNITION CYLINDER | 3 | 3 | 3 | 3 | 4 | 4 | 4 | 4 | 4 | 4 | 2 | 2 |

| 370 | 410 | 440 | 470 | 510 | 540 | 570 | 600 | 630 | 660 | 690 | 720 |
|---|---|---|---|---|---|---|---|---|---|---|---|
| 2 | 2 | 2 | 2 | 1 | 1 | 1 | 1 | 1 | 1 | 3 | 3 |

(1···FIRST CYLINDER, 2···SECOND CYLINDER, 3···THIRD CYLINDER, 4···FOURTH CYLINDER)

ENGINE AUTOMATIC STOP-START CONTROLLER

CROSS REFERENCE TO RELATED APPLICATION

This application is based on and incorporates herein by reference Japanese Patent Application No. 2008-205952 filed on Aug. 8, 2008.

BACKGROUND OF THE INVENTION

1. Field of the Invention

The present invention relates to an engine automatic stop-start controller having a function to determine existence/nonexistence of a misfire in a cylinder (first ignition cylinder) that performs ignition first in automatic start.

2. Description of Related Art

In a vehicle mounted with an engine automatic stop-start system (idle stop system), an automatic start condition is established and the engine is started automatically when a driver performs an operation for starting the vehicle (e.g., brake release) during automatic stop (idle stop). If a misfire occurs in a cylinder (first ignition cylinder) that performs ignition first in the automatic start, startability worsens and the driver feels that the start is slow. Moreover, problems such as exhaust emission deterioration occur.

Therefore, as described in Patent document 1 (Japanese Patent No. 4029474), there is a system that measures a start time and determines that the startability has deteriorated if the start time exceeds an abnormality determination threshold value. When the system determines that the startability has deteriorated, the system prohibits or restricts the automatic stop (idle stop).

However, the start time fluctuates due to many factors such as a state of a starting device, a charged state of a battery and an electric load. Therefore, it is required to set the abnormality determination threshold value of the start time at a relatively large value in consideration of the above many fluctuation factors in order to prevent erroneous determination of the abnormality. Therefore, it is difficult for the technology of Patent document 1 to determine whether the cylinder (first ignition cylinder) that performs the ignition first in the automatic start has caused a misfire.

SUMMARY OF THE INVENTION

The present invention has been made in consideration of the above circumstances. Accordingly, it is an object of the present invention to provide an engine automatic stop-start controller capable of accurately sensing whether a cylinder (first ignition cylinder) that performs ignition first in automatic start has caused a misfire.

In order to achieve the above object, according to a first aspect of the invention, an engine automatic stop-start controller that automatically stops an engine when a predetermined automatic stop condition is established and then automatically starts the engine when a predetermined automatic start condition is established has a first ignition cylinder setting section and a misfire determination section. The first ignition cylinder setting section sets a first ignition cylinder that performs ignition first based on an engine stop position in the automatic start. The misfire determination section determines existence or nonexistence of a misfire in the first ignition cylinder based on whether a difference between engine rotation speed at a predetermined crank angle in an interval from timing immediately before the ignition to timing immediately after the ignition of the first ignition cylinder and engine rotation speed at a predetermined crank angle before ignition of a second ignition cylinder is equal to or lower than a predetermined misfire determination threshold value.

If the first ignition cylinder causes normal combustion, the engine rotation speed (Ne) increases suddenly as shown in FIG. 19. If the first ignition cylinder causes the misfire, the engine rotation speed does not increase significantly as compared to the case of the normal combustion. Therefore, the existence or nonexistence of the misfire in the first ignition cylinder can be determined based on whether the difference ($\Delta Ne$) between the engine rotation speed at a predetermined crank angle in the interval from the timing immediately before the ignition to the timing immediately after the ignition of the first ignition cylinder and the engine rotation speed at a predetermined crank angle before the ignition of the second ignition cylinder is equal to or lower than the predetermined misfire determination threshold value. Thus, it can be accurately determined whether the first ignition cylinder has caused the misfire in the automatic start.

In this case, it is thought that the engine rotation speed in the interval from the timing immediately before the ignition to the timing immediately after the ignition of the first ignition cylinder is close to cranking rotation speed achieved by a starter. Therefore, as in a second aspect of the present invention, the existence or nonexistence of the misfire in the first ignition cylinder may be determined based on whether the engine rotation speed at a predetermined crank angle after the ignition of the first ignition cylinder and before the ignition of the second ignition cylinder is equal to or lower than a predetermined misfire determination threshold value. The misfire determination threshold value of the second aspect may be set at a value larger than the misfire determination threshold value of the first aspect by an amount corresponding to the cranking rotation speed. Thus, it can be accurately determined whether the first ignition cylinder has caused the misfire in the automatic start like the first aspect.

According to a third aspect of the present invention, the engine automatic stop-start controller has an automatic start control section for prohibiting fuel supply to the first ignition cylinder and for starting the automatic start from the second ignition cylinder when misfire time number or misfire frequency of the first ignition cylinder sensed by the misfire determination section exceeds a predetermined value. With such the construction, when the misfire time number or the misfire frequency of the first ignition cylinder exceeds the predetermined value, the automatic start can be started by changing the second ignition cylinder into the first ignition cylinder. Therefore, the occurrence of the misfire at the first ignition in the automatic start can be precluded.

In this case, as in a fourth aspect of the present invention, the misfire time number or the misfire frequency at the time when each cylinder is the first ignition cylinder may be counted for each cylinder and the misfire time number or the misfire frequency may be stored in a memory for each cylinder. With such the construction, whichever cylinder becomes the first ignition cylinder, if said cylinder tends to cause the misfire, the automatic start can be started by changing the second ignition cylinder into the first ignition cylinder. Thus, the occurrence of the misfire at the first ignition in the automatic start can be precluded.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

FIG. 13 is a diagram showing an example of a first ignition cylinder map.

DETAILED DESCRIPTION OF EXAMPLE EMBODIMENT

Hereinafter, an embodiment embodying the best mode for implementing the present invention will be described.

Figure 1:
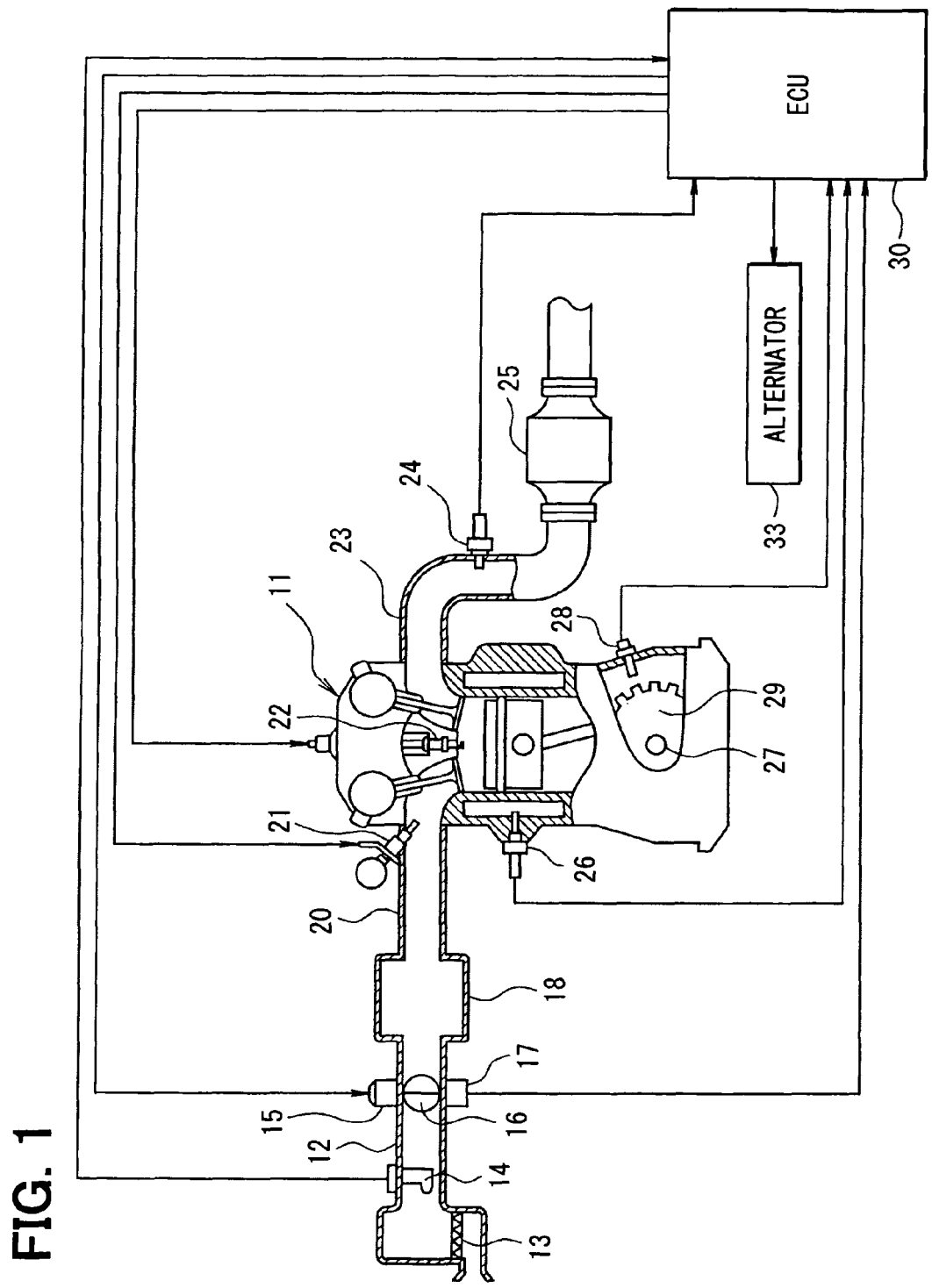
FIG. 1 is a schematic construction diagram of an entire engine control system according to an embodiment of the present invention.

First, a schematic construction of entirety of an engine control system will be explained with reference to FIG. 1.

An air cleaner 13 is arranged in the most upstream portion of an intake pipe 12 of an internal combustion engine 11. An airflow meter 14 sensing intake air quantity is provided downstream of the air cleaner 13. A throttle valve 16, whose opening degree is regulated by a motor 15, and a throttle position sensor 17 sensing the opening degree of the throttle valve 16 (throttle opening) are provided downstream of the airflow meter 14. A surge tank 18 is provided downstream of the throttle valve 16. An intake manifold 20 that introduces air into each cylinder of the engine 11 is connected to the surge tank 18. An injector 21 that injects fuel is provided near an intake port of the intake manifold 20 of each cylinder. A spark plug 22 is provided to a cylinder head of the engine 11 for each cylinder. A mixture gas in the cylinder is ignited by a spark discharge of the spark plug 22.

An exhaust gas sensor 24 (air-fuel ratio sensor, oxygen sensor or the like) that senses an air-fuel ratio or a rich/lean state of exhaust gas is provided to an exhaust pipe 23 of the engine 11. A catalyst 25 such as a three-way catalyst that purifies the exhaust gas is provided downstream of the exhaust gas sensor 24.

A coolant temperature sensor 26 that senses coolant temperature is provided to a cylinder block of the engine 11. A signal rotor 29 having teeth on its outer periphery at a predetermined crank angle pitch is fitted to a crankshaft 27 of the engine 11. A crank angle sensor 28 is provided to be opposed to the outer periphery of the signal rotor 29. Every time the tooth of the signal rotor 29 faces the crank angle sensor 28 (i.e., every time crankshaft 27 rotates by predetermined crank angle), the crank angle sensor 28 outputs a crank pulse signal. Engine rotation speed is sensed based on a cycle of the output pulse of the crank angle sensor 28 (or pulse output frequency). A cam angle sensor (not shown) that outputs a cam pulse signal at a predetermined cam angle in synchronization with rotation of a camshaft of the engine 11 is provided.

Rotation of the crankshaft 27 is transmitted to an alternator 33 as a typical accessory of the engine 11 through a belt transmission mechanism (not shown). Thus, the alternator 33 is rotated and driven by the power of the engine 11 to generate electricity. Torque of the alternator 33 can be controlled by duty control of a power generation control current (field current) of the alternator 33. In the present embodiment, the alternator 33 is used as an electric machinery described in the claims.

Outputs of the above various sensors are inputted to an engine control circuit 30 (hereafter, referred to as ECU). The ECU 30 is constituted mainly by a microcomputer and controls fuel injection quantity and injection timing of the injector 21 and ignition timing of the spark plug 22 in accordance with an engine operation state sensed with the various sensors. When a predetermined automatic stop condition is established and an engine stop request (idle stop request) is generated during an idle operation, the ECU 30 performs an idle stop to stop combustion (ignition and/or fuel injection) and to stop the engine rotation. When a driver performs an operation for starting a vehicle while the engine is stopped by the idle stop, a predetermined automatic start condition is established and the ECU 30 energizes a starter (not shown) to crank and automatically start the engine 11.

The ECU 30 executes routines shown in FIGS. 3 to 14 explained later. Thus, the ECU 30 sets target rotation speed at a reference point set at a top dead center (TDC), which precedes a target stop position (target stop crank angle) of the engine rotation by a predetermined crank angle. In addition, the ECU 30 calculates a trajectory (target trajectory) of a target engine rotation behavior since engine stop control is started until the target rotation speed at the reference point is reached based on the target rotation speed at the reference point and an engine friction. The ECU 30 controls the torque of the alternator 33 to conform the engine rotation behavior to the target trajectory during execution of the engine stop control.

The target rotation speed at the reference point, which is set at the TDC preceding the target stop position of the engine rotation by the predetermined crank angle, is set at rotation speed that is equal to or lower than lower limit rotation speed of a rotation speed range, in which the torque of the alternator 33 is generated, and that is close to the lower limit rotation speed. More specifically, the target rotation speed at the reference point is set such that the engine rotation speed between the reference point and the TDC immediately preceding the reference point becomes equal to or lower than the lower limit rotation speed of the torque generation rotation speed range of the alternator 33. With such the setting, in an interval since the engine rotation stop behavior starts until the vicinity of the target rotation speed at the reference point is reached, control can be performed to conform the engine rotation behavior to the target trajectory using the torque of the alternator 33. In addition, the torque of the alternator 33 does not affect the engine rotation behavior from the reference point to the target stop position. Thus, an error in the stop position due to the torque of the alternator 33 can be eliminated.

Figure 2:
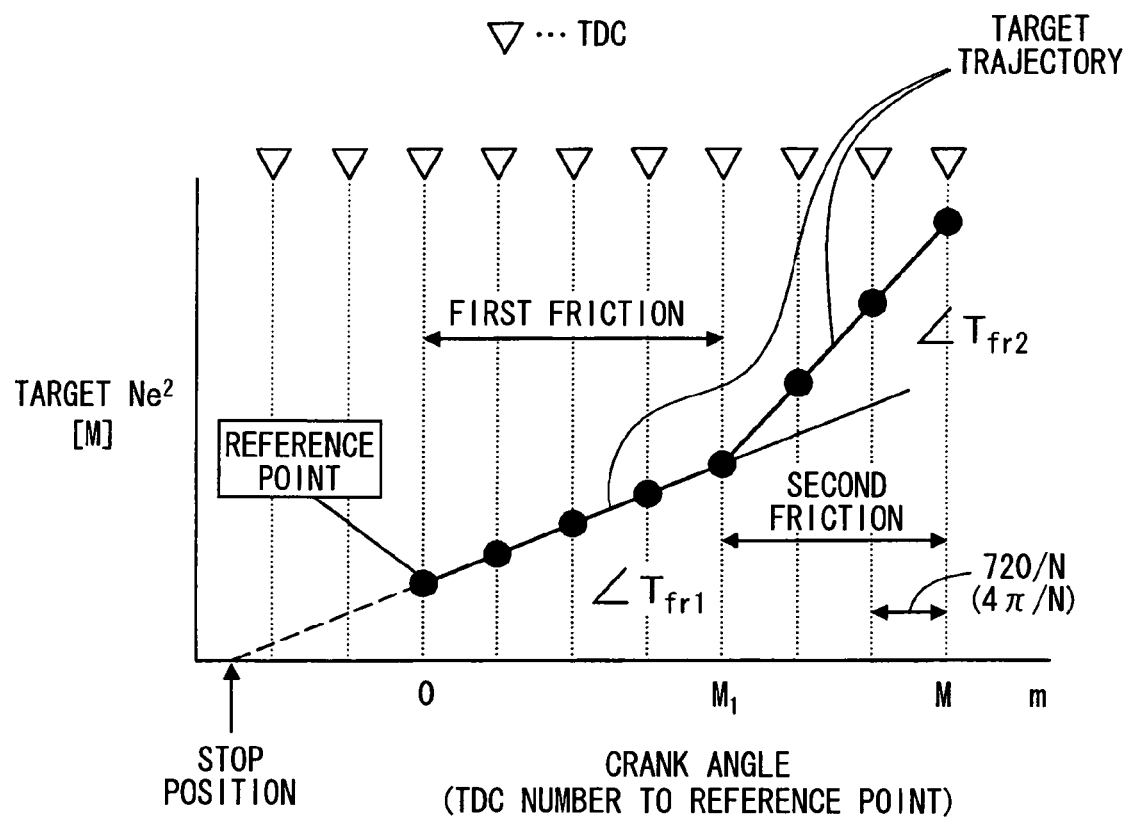
FIG. 2 is a diagram illustrating a setting method of a target trajectory.

The target trajectory is defined by calculating target engine rotation speeds for respective TDCs in the interval since the engine rotation stop behavior starts until the target rotation speed at the reference point is reached and by allotting the calculated target engine rotation speeds in a table (refer to FIG. 2).

During an engine stop process, a kinetic energy (rotation energy) is attenuated by the engine friction and the engine rotation speed decreases. Therefore, the actual engine rotation speed can be conformed to the target rotation speed at the reference point with high accuracy by calculating the target trajectory based on the engine friction and the target rotation speed at the reference point and by controlling the torque of the alternator 33 to conform the actual engine rotation behavior to the target trajectory. Moreover, the torque of the alternator 33 does not affect the engine rotation behavior in the interval from the reference point to the target stop position. Therefore, the error of the stop position due to the torque of the alternator 33 can be eliminated. As a result, the actual stop position of the engine rotation can be conformed to the target stop position with high accuracy.

In the process since the engine rotation stop behavior starts until the target rotation speed at the reference point is reached, a characteristic of the engine friction changes in accordance with the crank angle to the reference point because of the multiple accessories of the engine 11 and the like. In consideration of this point, in the present embodiment, the target trajectory is calculated by selecting the engine friction from the multiple engine frictions in accordance with the crank angle to the reference point. In the example of FIG. 2, the engine friction set in an interval from the reference point to M1 is different from the engine friction set in an interval from M1 to M.

As mentioned above, the target rotation speed at the reference point is set equal to or lower than the lower limit rotation speed of the rotation speed range in which the torque of the alternator 33 is generated. Therefore, a state where the torque of the alternator 33 is not generated arises before the reference point is reached.

Figure 22:
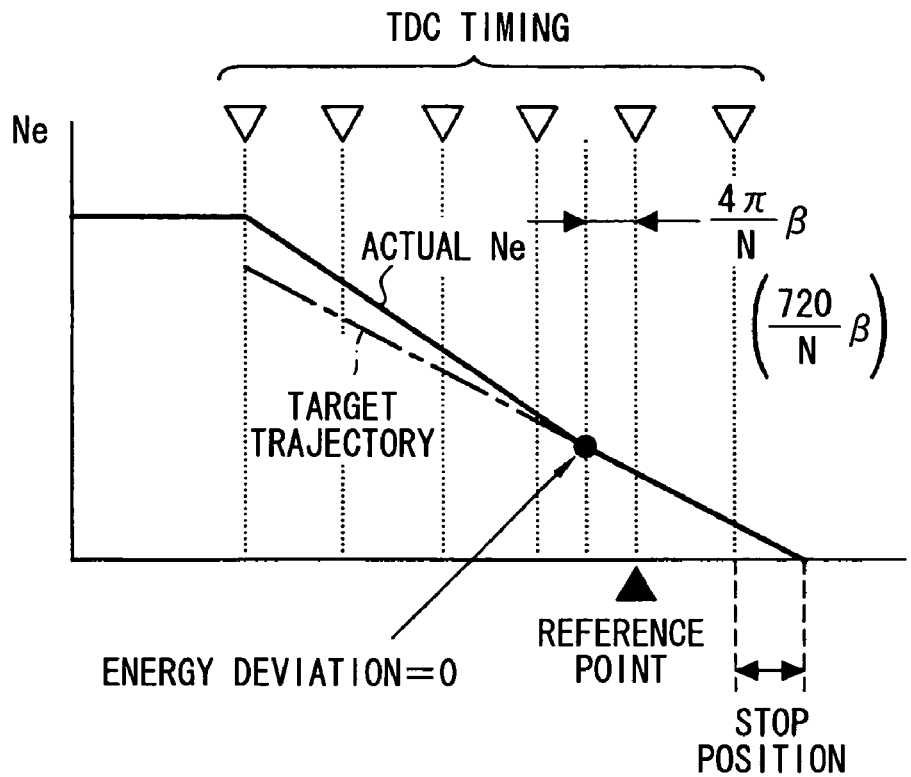
FIG. 22 is a diagram illustrating a method for calculating feedback correction torque Tfb such that a deviation (energy deviation) between target $Ne^2$ and actual $Ne^2$ becomes zero at a position preceding a reference point by a predetermined crank angle $[(4\pi/N)\times\beta]$.

In consideration of this point, in the present embodiment, as shown in FIG. 22, the torque of the alternator 33 is controlled by calculating feedback correction torque Tfb such that a deviation (energy deviation) between the target trajectory and the engine rotation behavior becomes zero at a position preceding the reference point by a predetermined crank angle $[(4\pi/N)\times\beta]$. N is the number of the cylinders of the engine 11, and $\beta$ is an adjustment parameter for calculating the crank angle from the reference point to a position where the generation of the torque of the alternator 33 ceases $(0 \leq \beta \leq 1)$.

In the present embodiment, the position preceding the reference point by the predetermined crank angle $[(4\pi/N)\times\beta]$ is set at a position where the engine rotation speed coincides with the lower limit rotation speed of the torque generation rotation speed range of the alternator 33. Alternatively, according to the present invention, the position preceding the reference point by the predetermined crank angle $[(4\pi/N)\times\beta]$ may be set at a position where the engine rotation speed becomes rotation speed slightly higher than the lower limit rotation speed of the torque generation rotation speed range of the alternator 33.

In a conventional engine control system, an engine rotation position is unknown from engine start to completion of cylinder determination processing (determination processing of reference position) based on the output pulses of the crank angle sensor 28 and the cam angle sensor. Therefore, it has been impossible to set a cylinder (first ignition cylinder) that performs ignition first in the automatic start.

As contrasted thereto, according to the present embodiment, the engine stop position in the automatic stop can be accurately controlled to the target stop position. Therefore, it can be estimated that the engine stop position immediately before the automatic start is the target stop position. In consideration of this point, in the present embodiment, a cylinder (first ignition cylinder) that performs the ignition first is set based on the engine rotation stop position (=target stop position) in the automatic start. Then, existence/nonexistence of a misfire in the first ignition cylinder is determined based on whether a difference between the engine rotation speed at a predetermined crank angle in an interval from timing immediately before the ignition to timing immediately after the ignition of the first ignition cylinder (e.g., at TDC of first ignition cylinder) and the engine rotation speed at a predetermined crank angle before ignition of a second ignition cylinder (e.g., at TDC of second ignition cylinder) is "equal to or smaller than" a predetermined misfire determination threshold value. When the misfire time number of the first ignition cylinder exceeds a predetermined value, the fuel supply to the first ignition cylinder is prohibited and the automatic start is started from the second ignition cylinder. Thus, it can be accurately determined whether the misfire has occurred in the first ignition cylinder in the automatic start. In addition, when the misfire time number of the first ignition cylinder exceeds the predetermined value, the automatic start can be started by changing the second ignition cylinder into the first ignition cylinder. Therefore, the occurrence of the misfire at the first ignition in the automatic start can be precluded.

The above-described engine automatic stop-start control according to the present embodiment is performed by the ECU 30 according to the respective routines of FIGS. 3 to 14. Next, processing contents of the respective routines will be explained.

[Time Synchronization Routine]

Figure 3:
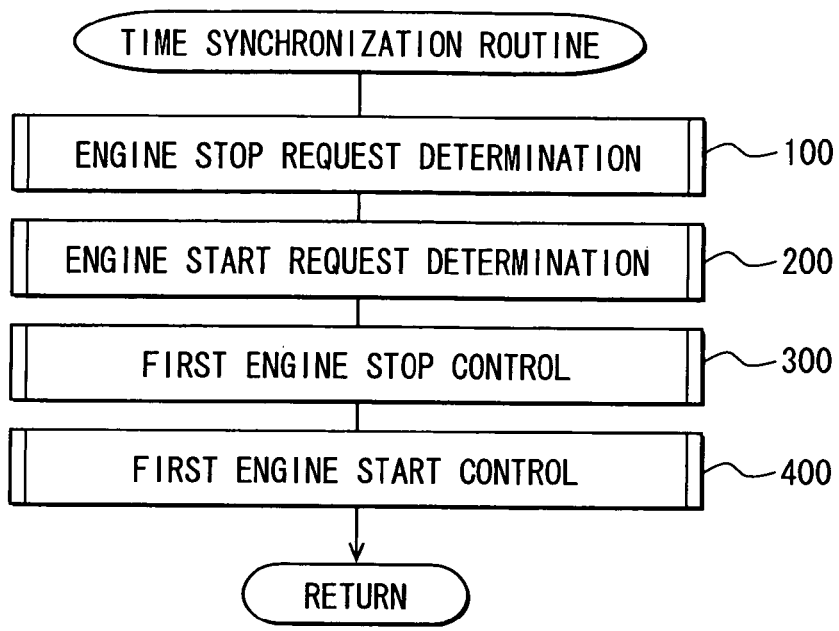
FIG. 3 is a flowchart illustrating a processing flow of a time synchronization routine.

A time synchronization routine shown in FIG. 3 is performed by the ECU 30 repeatedly in a predetermined cycle (e.g., 8 ms cycle) while a power source of the ECU 30 is ON (i.e., while a power source of an ignition switch is ON). If the routine is started, first in step 100, an engine stop request determination routine shown in FIG. 5 explained later is executed to determine whether an engine stop request (idle stop request) is generated.

Then, the process proceeds to step 200, in which an engine start request determination routine shown in FIG. 6 explained later is executed to determine whether an engine start request (automatic start request after idle stop) is generated.

Then, the process proceeds to step 300, in which a first engine stop control routine shown in FIG. 7 explained later is executed to calculate request torque of the alternator 33 (hereafter, referred to as request alternator torque). Then, in following step 400, a first engine start control routine shown in FIG. 12 explained later is executed to set a first ignition cylinder and a second ignition cylinder in the automatic start.

[Crank Angle Synchronization Routine]

Figure 4:
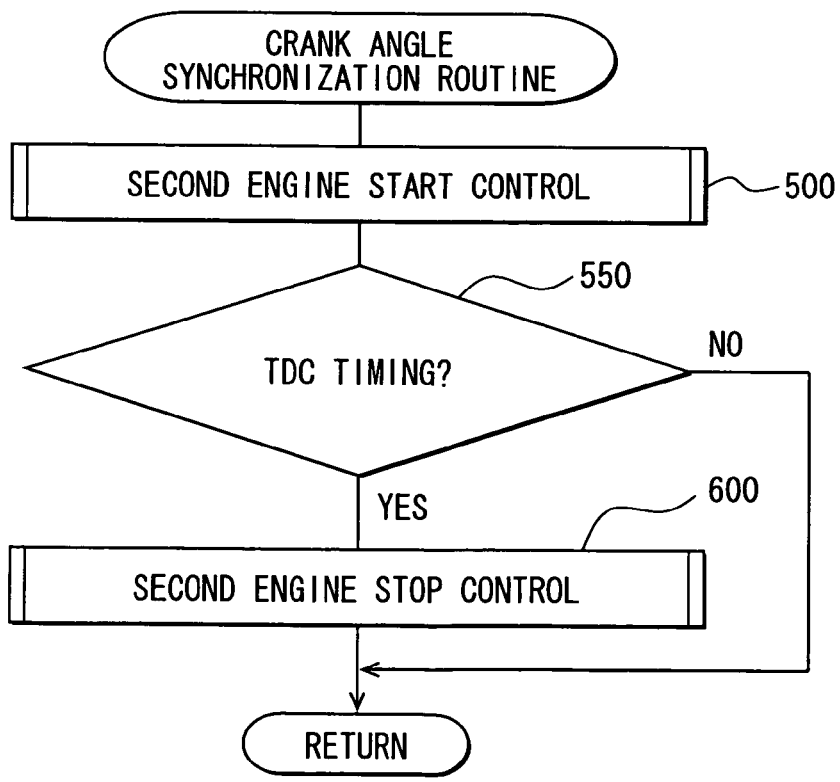
FIG. 4 is a flowchart illustrating a processing flow of a crank angle synchronization routine.

A crank angle synchronization routine shown in FIG. 4 is executed by the ECU 30 repeatedly at every predetermined crank angle (e.g., at every 30 deg CA) while the power source of the ECU 30 is ON (i.e., while the power source of the ignition switch is ON). If the routine is started, first in step 500, a second engine start control routine shown in FIG. 14 explained later is executed to perform fuel injection control, ignition control and misfire determination of the first ignition cylinder in the automatic start.

Then, the process proceeds to step 550, in which it is determined whether present time is TDC timing as execution timing of stop position control. If the present time is not the TDC timing, the routine is ended as it is. If the present time is the TDC timing, the process proceeds to step 600, in which a second engine stop control routine shown in FIG. 10 explained later is executed to perform the stop position control.

[Engine Stop Request Determination Routine]

Figure 5:
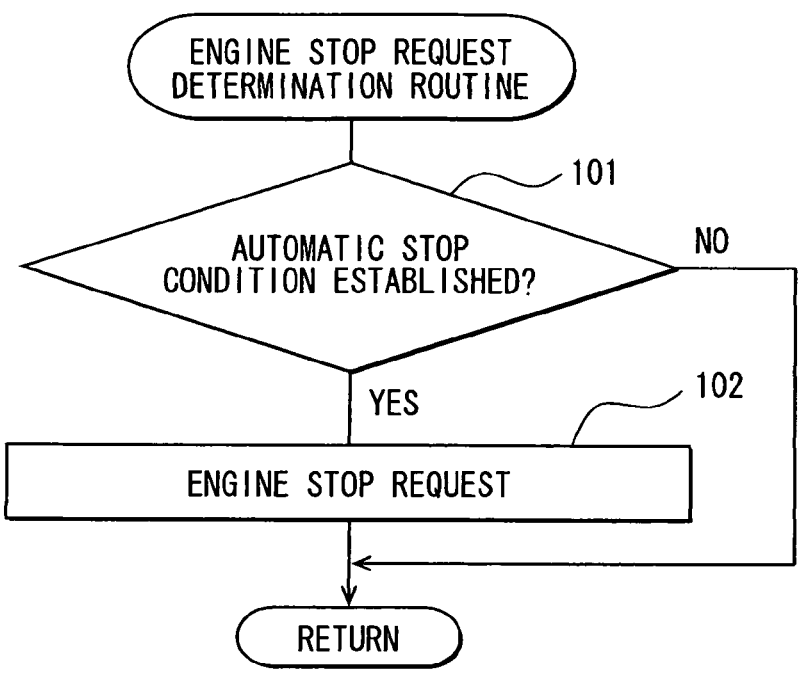
FIG. 5 is a flowchart illustrating a processing flow of an engine stop request determination routine.

The engine stop request determination routine shown in FIG. 5 is a subroutine executed in step 100 of the time synchronization routine of FIG. 3. If the routine is started, first in step 101, it is determined whether an automatic stop condition (idle stop execution condition) is established.

In the case of a manual transmission vehicle, the automatic stop condition is established when either one of following conditions (a), (b) is satisfied.

(a) A shift position is in a forward gear range, vehicle speed is equal to or lower than a predetermined value (for example, equal to or lower than 10 km/h), a brake pedal is pressed (brake=ON), and a clutch is disengaged (clutch pedal is pressed).

(b) A shift position is in a neutral range and a clutch is engaged (clutch pedal is not pressed).

In the case of an automatic transmission vehicle (AT vehicle), the automatic stop condition is established when either one of following conditions (c), (d) is satisfied.

(c) A shift position is in a forward gear range or in a neutral range, vehicle speed is equal to or lower than a predetermined value (for example, equal to or lower than 10 km/h), and a brake pedal is pressed (brake=ON).

(d) A shift position is in a parking range.

If it is determined that the automatic stop condition is not established in step 101, the routine is ended as it is. If it is determined that the automatic stop condition is established in step 101, the process proceeds to step 102, in which the engine stop request is outputted (ON) and the routine is ended.

[Engine Start Request Determination Routine]

Figure 6:
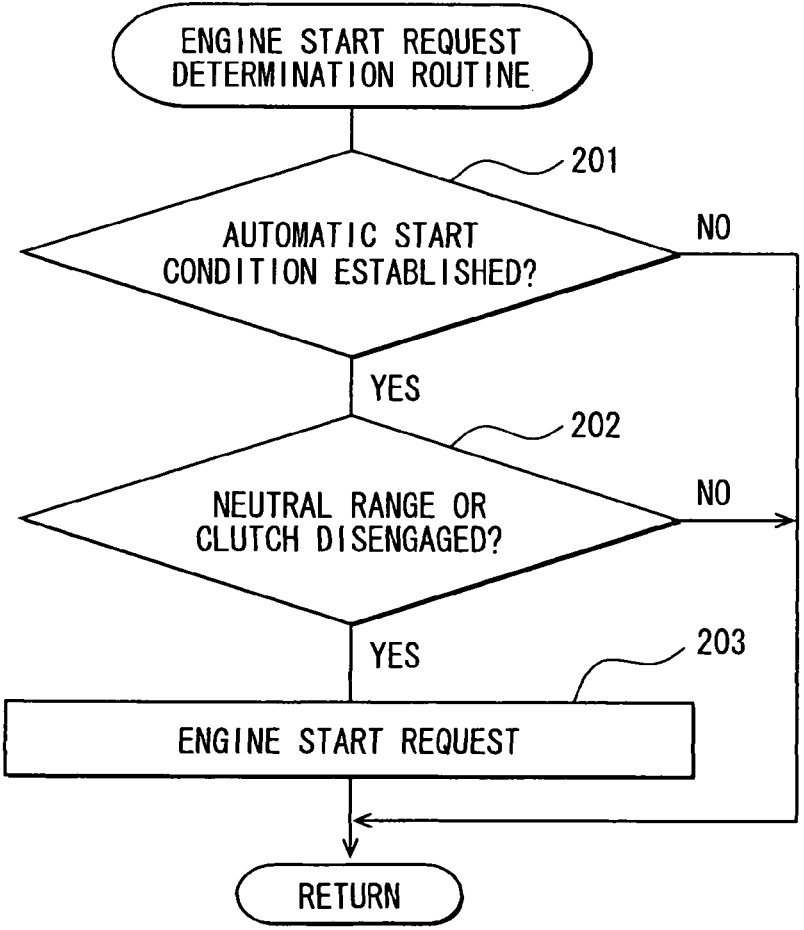
FIG. 6 is a flowchart illustrating a processing flow of an engine start request determination routine.

The engine start request determination routine shown in FIG. 6 is a subroutine executed in step 200 of the time synchronization routine of FIG. 3. If the routine is started, first in step 201, it is determined whether the automatic start condition is established (i.e., whether driver has performed operation for starting vehicle).

In the case of a manual transmission vehicle, it is determined that the driver has performed the operation for starting the vehicle and the automatic start condition is established when either one of following conditions (a), (b) is satisfied.

(a) A shift position is in a forward gear range and a brake operation is cancelled (brake=OFF) or a clutch is engaged (clutch pedal is not pressed).

(b) A shift position is in a neutral range and a clutch is disengaged (clutch pedal is pressed).

In the case of an automatic transmission vehicle (AT vehicle), it is determined that the driver has performed the operation for starting the vehicle and the automatic start condition is established when a following condition (c) is established.

(c) A shift position is in other range than a parking range and a brake operation is cancelled (brake=OFF).

When it is determined that the automatic start condition is not established in step 201, the routine is ended as it is. When it is determined that the automatic start condition is established in step 201, the process proceeds to step 202, in which it is determined whether the shift position is in a neutral range or a clutch is disengaged (clutch pedal is pressed). If the automatic start is performed when the shift position is not in the neutral range and also the clutch is not disengaged, the power of the engine 11 is transmitted to driving wheels and the vehicle starts moving on its own. Therefore, in this case, the routine is ended without outputting the engine start request.

When it is determined in step 202 that the shift position is in the neutral range or the clutch is disengaged (clutch pedal is pressed), the power transmission from the engine 11 to the driving wheels is blocked and the vehicle maintains the stopped state even if the automatic start is performed. Therefore, in this case, the process proceeds to step 203, in which the engine start request is outputted, and the routine is ended.

[First Engine Stop Control Routine]

Figure 7:
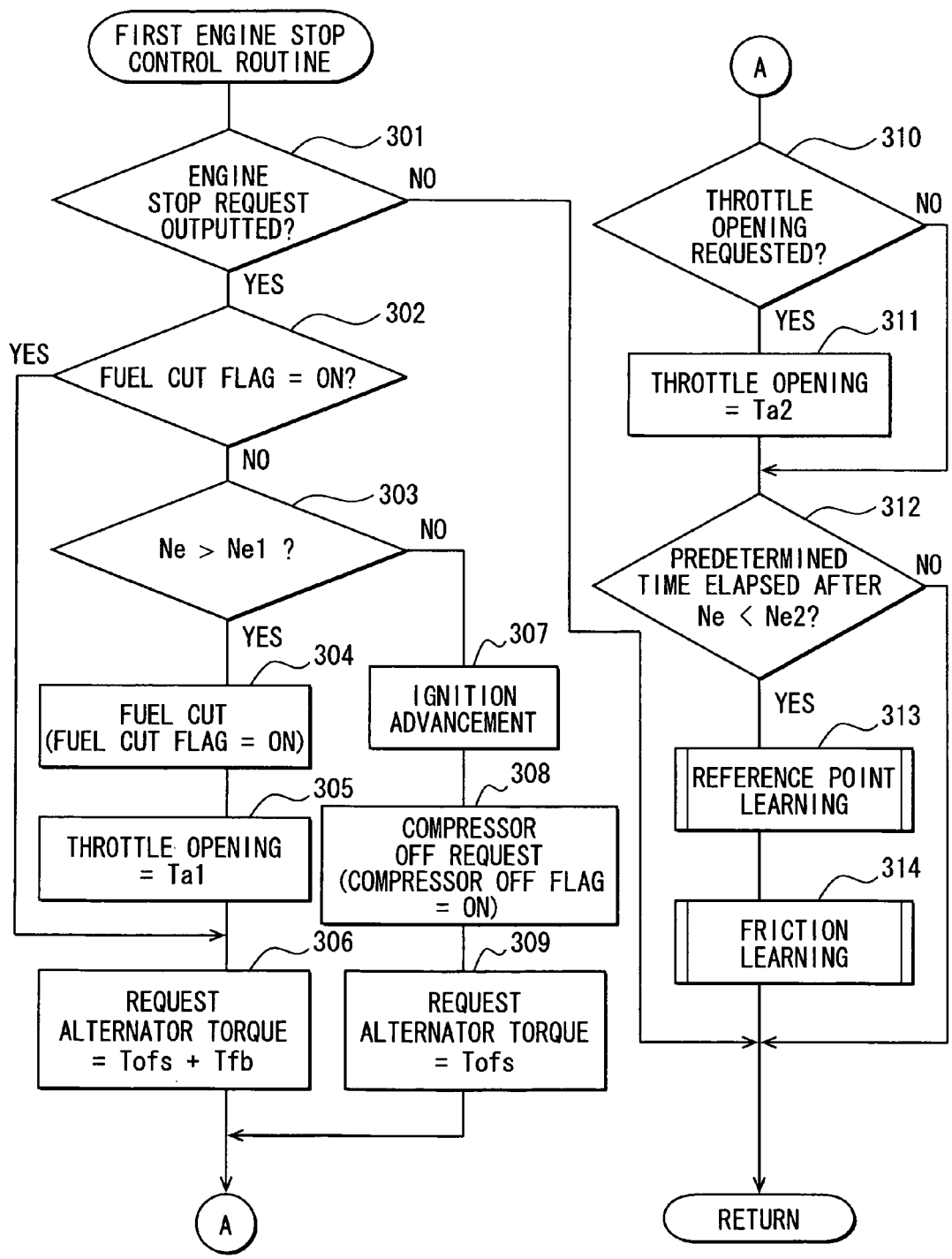
FIG. 7 is a flowchart illustrating a processing flow of a first engine stop control routine.

The first engine stop control routine shown in FIG. 7 is a subroutine performed in step 300 of the time synchronization routine of FIG. 3. If the routine is started, first in step 301, it is determined whether an engine stop request is outputted based on the processing result of the engine stop request determination routine of FIG. 5. When the engine stop request is not outputted, the routine is ended as it is without performing subsequent processing.

If it is determined in step 301 that the engine stop request is outputted, the process proceeds to step 302, in which it is determined whether a fuel cut flag is set at ON. The fuel cut flag is set in step 304 mentioned later. When the fuel cut flag is set at ON, it indicates that fuel cut is in execution. When the fuel cut flag is not set at ON, the process proceeds to step 303, in which it is determined whether present engine rotation speed Ne is higher than a predetermined value Ne1: In accordance with the determination result, processing of steps 304 to 306 or processing of steps 307 to 309 is performed. If the engine rotation speed Ne at the start of the engine stop control is too low, the number of the TDCs until the reference point is reached becomes too small and it becomes difficult to conform the engine rotation behavior to the target trajectory. Therefore, the processing of steps 304 to 306 and the processing of steps 307 to 309 are provided to control the engine rotation speed Ne at the start of the engine stop control to or over the predetermined value Ne1 necessary for conforming the engine rotation behavior to the target trajectory.

If it is determined in step 303 that the present engine rotation speed Ne is higher than the predetermined value Ne1, it is determined that the engine rotation speed Ne necessary for conforming the engine rotation behavior to the target trajectory is secured. In this case, the process proceeds to step 304, in which the fuel cut flag is set at ON to perform the fuel cut. In following step 305, the throttle opening is increased to a first predetermined value Ta1 (i.e., opening larger than idle speed control opening). In following step 306, the request alternator torque is set by adding offset torque Tofs, which is reference torque of the torque control of the alternator 33, and feedback correction torque Tfb, which is used for performing feedback correction of an error between the actual engine rotation behavior and the target trajectory.

Request alternator torque=$Tofs+Tfb$

For example, the offset torque Tofs is set at a half of maximum controllable torque of the alternator 33. The alternator 33 cannot output assist torque unlike a motor generator, but the torque of the alternator 33 can be controlled in both of positive and negative directions in a virtual manner. That is, the torque of the alternator 33 can be controlled by regarding the torque smaller than the offset torque Tofs as virtual negative torque and regarding the torque larger than the offset torque Tofs as virtual positive torque. Thus, performance of the engine rotation behavior to follow the target trajectory can be improved.

The offset torque Tofs is not limited to the half of the maximum torque. Alternatively, the offset torque Tofs may be $\frac{1}{3}$, $\frac{1}{4}$, $\frac{2}{3}$, $\frac{3}{4}$ or the like of the maximum torque. Arbitrary torque that is smaller than the maximum controllable torque of the alternator 33 and larger than zero may be set as the offset torque Tofs.

$0 < Tofs < $ maximum torque

If it is determined in step 302 that the fuel cut flag has been already set at ON, the processing of steps 303 to 305 is skipped and the processing of step 306 is executed.

If it is determined in step 303 that the present engine rotation speed Ne is equal to or lower than the predetermined value Ne1, the process proceeds to step 307, in which the ignition timing is advanced to a certain value or a knock limit. Thus, the engine torque is increased and the engine rotation speed Ne is increased. In following step 308, a compressor OFF request is outputted (i.e., compressor OFF flag is switched on) to switch off a compressor of an air conditioner. Thus, a load on the engine 11 is reduced and the engine rotation speed Ne is increased. Alternatively, the engine rotation speed may be increased by increasing the intake air quantity (i.e., increasing throttle opening) or increasing the fuel injection quantity. Then, the process proceeds to step 309, in which request alternator torque is restricted to the offset torque Tofs.

Request alternator torque=$Tofs$

In following step 310, it is determined whether a throttle opening is requested (i.e., whether TDC immediately before stop position has been passed). If the throttle opening is requested, the process proceeds to step 311, in which the throttle opening is set to a second predetermined value Ta2 larger than the first predetermined value Ta1. If it is determined in step 310 that there is no throttle opening request, the processing in step 311 is not executed and the throttle opening is continuously maintained at the first predetermined value Ta1.

Figure 15:
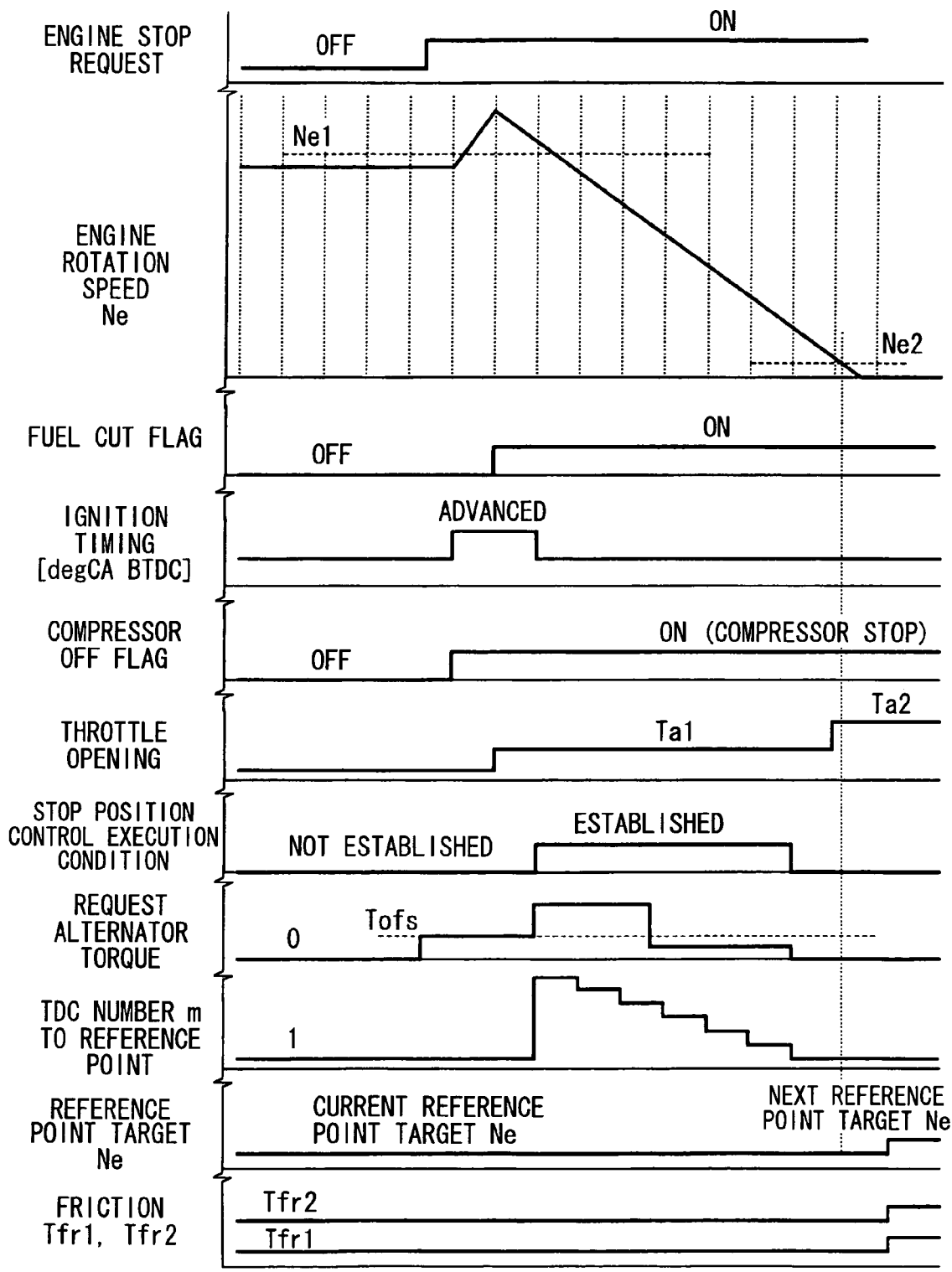
FIG. 15 is a time chart showing an example of engine stop control according to the embodiment.

Then, the process proceeds to step 312, in which it is determined whether a predetermined time has elapsed after the engine rotation speed Ne lowers to speed equal to or lower than rotation speed Ne2 immediately preceding the engine stop. As shown in FIG. 15, the rotation speed Ne2 immediately before the stop corresponds to rotation speed at time immediately after the TDC, which is immediately before the stop position. The predetermined time is set to time for waiting until the engine rotation surely stops.

If it is determined in step 312 that the predetermined time has not elapsed after the engine rotation speed Ne lowers to speed equal to or lower than the rotation speed Ne2 immediately preceding the stop, the routine is ended as it is. Thereafter, if step 312 is determined to be "Yes" when the predetermined time elapses after the engine rotation speed Ne lowers to speed equal to or lower than the rotation speed Ne2 immediately preceding the stop, the process proceeds to step 313. In step 313, a reference point learning routine of FIG. 8 explained later is executed to calculate target Ne at a next reference point. Ne means the rotation speed, hereinafter. Then, the process proceeds to step 314, in which a friction learning routine of FIG. 9 explained later is executed to learn first and second frictions Tfr1, Tfr2 of the engine 11.

[Reference Point Learning Routine]

Figure 8:
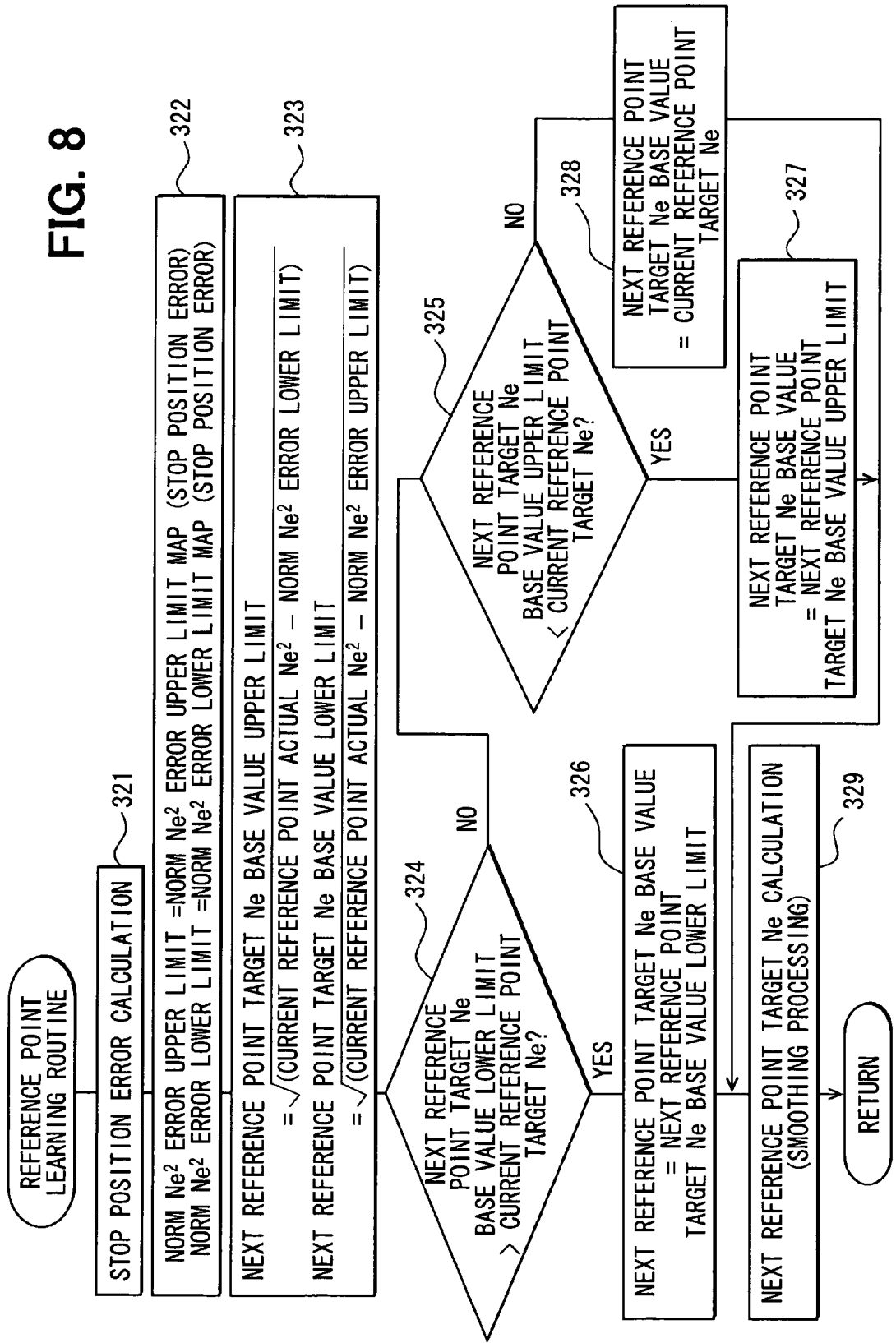
FIG. 8 is a flowchart illustrating a processing flow of a reference point learning routine.

The reference point learning routine shown in FIG. 8 is a subroutine executed in step 313 of the first engine stop control shown in FIG. 7 and functions as a learning correction means of the claims. If the routine is started, first in step 321, a stop position error is calculated by a following formula.

Stop position error=(actual stop position crank angle–current reference point crank angle)mod 720+{(720/N)×K–target stop position crank angle}

(Actual stop position crank angle–current reference point crank angle) mod 720 means a remainder crank angle provided when (actual stop position crank angle–current reference point crank angle) is divided by 720 [deg CA]. For example, when (actual stop position crank angle–current reference point crank angle) is 1000 [deg CA], (1000)mod 720=280 [deg CA].

When (actual stop position crank angle–current reference point crank angle) is 400 [deg CA], (400)mod 720=400 [deg CA]. In the above formula, N represents the cylinder number of the engine 11 and K represents the number of the TDCs having passed from the current reference point to the actual stop position.

Figure 16:
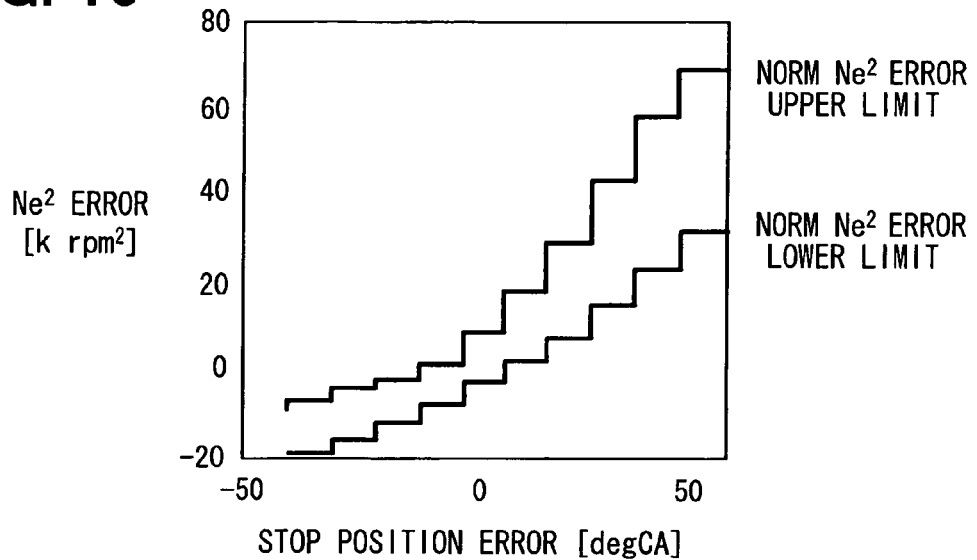
FIG. 16 is a diagram showing an example of a norm $Ne^2$ error upper limit and lower limit map.

Then, the process proceeds to step 322, in which an upper limit and a lower limit of a norm $Ne^2$ error corresponding to the stop position error are calculated with reference to a norm $Ne^2$ error upper limit and lower limit map shown in FIG. 16.

Norm $Ne^2$ error upper limit=norm $Ne^2$ error upper limit map(stop position error)

Norm $Ne^2$ error lower limit=norm $Ne^2$ error lower limit map(stop position error)

The norm $Ne^2$ error upper limit and lower limit map shown in FIG. 16 is set such that the upper limit and the lower limit of the norm $Ne^2$ error increase as the stop position error increases.

Then, the process proceeds to step 323, in which upper limit and lower limit of a next reference point target Ne base value are calculated by following formulae.

Next reference point target Ne base value upper limit= $\sqrt{}$(current reference point actual $Ne^2$–Norm $Ne^2$ error lower limit)

Next reference point target Ne base value lower limit= $\sqrt{}$(current reference point actual $Ne^2$–Norm $Ne^2$ error upper limit)

Then, the process proceeds to step 324, in which the next reference point target Ne base value lower limit is compared with the current reference point target Ne. If the next reference point target Ne base value lower limit is larger than the current reference point target Ne, the process proceeds to step 326, in which the next reference point target Ne base value lower limit is used as the next reference point target Ne base value.

Next reference point target Ne base value=next reference point target Ne base value lower limit If it is determined in step 324 that the next reference point target Ne base value lower limit is equal to or smaller than the current reference point target Ne, the process proceeds to step 325. In step 325, the next reference point target Ne base value upper limit is compared with the current reference point target Ne. If the next reference point target Ne base value upper limit is smaller than the current reference point target Ne, the process proceeds to step 327, in which the next reference point target Ne base value upper limit is used as the next reference point target Ne base value.

Next reference point target Ne base value=next reference point target Ne base value upper limit If the determination result is "NO" in both of steps 324 and 325, i.e., if the current reference point target Ne exists between the lower limit and the upper limit of the next reference point target Ne base value, the process proceeds to step 328. In step 328, the current reference point target Ne is continuously used as the next reference point target Ne base value.

Next reference point target Ne base value=current reference point target Ne

Thus, the next reference point target Ne base value is set in either one of steps 326 to 328. Then, the process proceeds to step 329, in which the next reference point target Ne is obtained by smoothing processing based on a following formula.

Next reference point target $Ne$=current reference point target $Ne$-$\gamma$·(current reference point target $Ne$-next reference point target Ne base value)

In the above formula, $\gamma$ is a smoothing coefficient ($0<\gamma\leq 1$).

[Friction Learning Routine]

Figure 9:
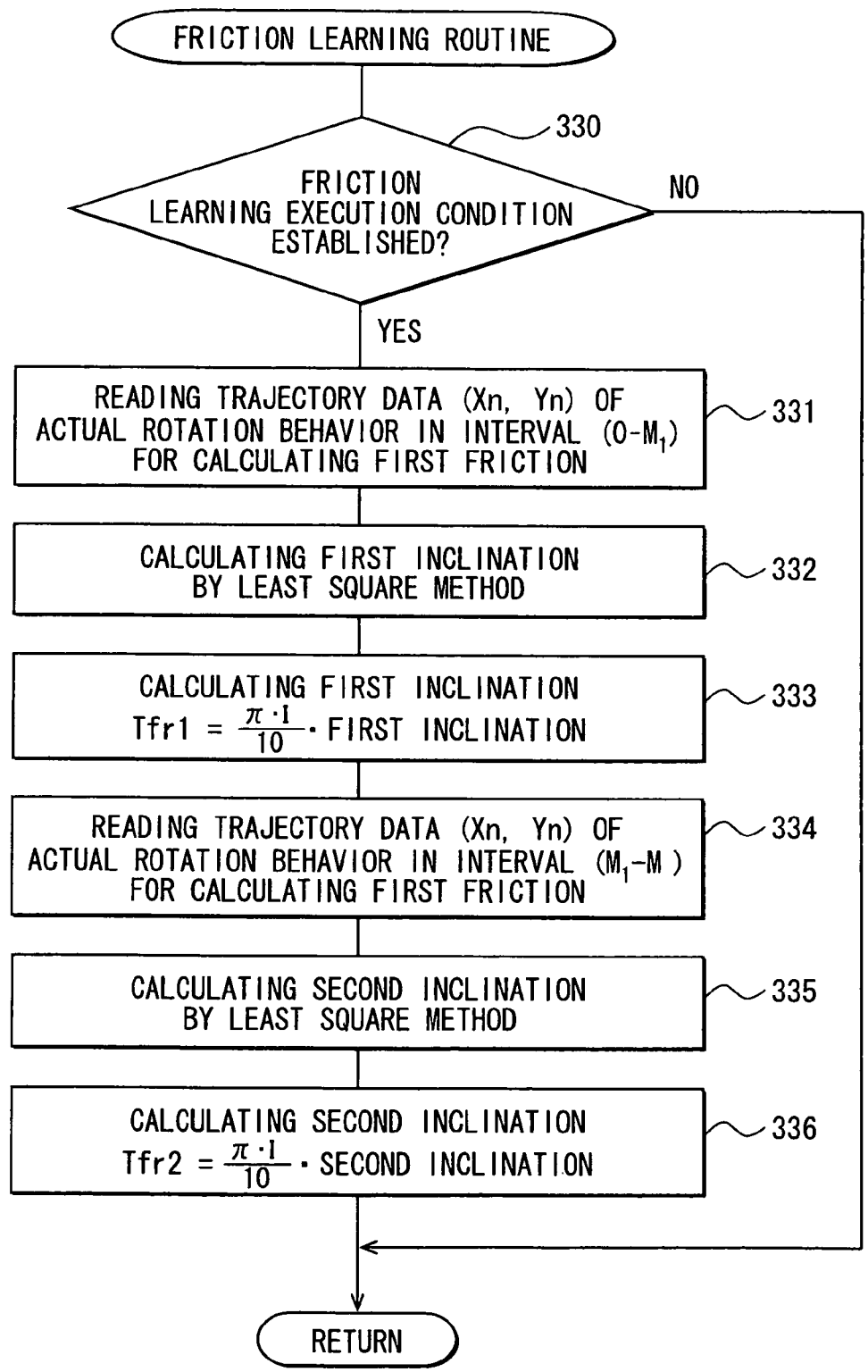
FIG. 9 is a flowchart illustrating a processing flow of a friction learning routine.

The friction learning routine shown in FIG. 9 is a subroutine executed in step 314 of the first engine stop control shown in FIG. 7. If the routine is started, first in step 330, it is determined whether a friction learning execution condition is established based on whether a stop position control mode (explained later)=1 (i.e., feedback correction torque Tfb=0). If the friction learning execution condition is not established, the routine is ended without performing subsequent processing.

If it is determined that the friction learning execution condition is established in step 330, the process proceeds to step 331. In step 331, trajectory data ($x_n$, $y_n$) of the actual rotation behavior in the interval (0 to $M_1$) in which the first friction (Tfr1) is calculated are read.

$X_n = \{0, 720/N \ldots, (720/N) \times M_1\}$ $y_n = \{$reference point actual $Ne^2$, actual $Ne^2$ at the time when m=1 ..., actual $Ne^2$ at the time when m=$M_1\}$ $X_n$ is a crank angle from the reference point to each TDC (0 to $M_1$) in the interval where the first friction is calculated (refer to FIG. 2). $y_n$ is actual $Ne^2$ at each TDC in the interval of the first friction. N is the cylinder number of the engine 11, and $M_1$ is a starting point of the interval of the first friction (i.e., the number of TDCs from reference point).

Then, the process proceeds to step 332, in which a first inclination is calculated by a least-square method.

$$\text{First inclination} = \frac{n\sum_{k=1}^{n} x_k y_k - \sum_{k=1}^{n} x_k \sum_{k=1}^{n} y_k}{n\sum_{k=1}^{n} x_k^2 - \left(\sum_{k=1}^{n} x_k\right)^2} \quad \text{[Expression 1]}$$

In the above formula, n=$M_1$+1.

Then, the process proceeds to step 333, in which the first friction (Tfr1) is calculated by a following formula using the first inclination.

$Tfr1 = (\pi \cdot I/10) \times$ first inclination

In the formula, I represents an engine inertia moment [kgm].

Then, the process proceeds to step 334. In step 334, trajectory data ($x_n$, $y_n$) of the actual rotation behavior in the interval ($M_1$ to M) in which the second friction (Tfr2) is calculated are read.

$X_n = \{0, 720/N \ldots, (720/N) \times (M-M_1)\}$ $y_n = \{$actual $Ne^2$ at $M_1$, actual $Ne^2$ at the time when $m=M_1+1$ ..., actual $Ne^2$ at the time when $m=M\}$ $x_n$ is a crank angle at each TDC ($M_1$ to M) in the interval, in which the second friction is calculated (refer to FIG. 2). $y_n$ is the actual $Ne^2$ at each TDC in the interval of the second friction.

Then, the process proceeds to step 335, in which a second inclination is calculated by a least square method. Then, the process proceeds to step 336, in which the second friction (Tfr2) is calculated by a following formula using the second inclination.

$Tfr2 = (\pi \cdot I/10) \times$ second inclination

When there are three or more frictions, processing for calculating the inclination by the above-described least square method and for calculating the friction may be repeated.

Alternatively, the function to learn the friction (friction learning routine) may be omitted. The present invention may be embodied by calculating the friction based on experiment data, design date and the like and by storing the friction in a nonvolatile memory such as ROM of the ECU 30 beforehand.

[Second Engine Stop Control Routine]

Figure 10:
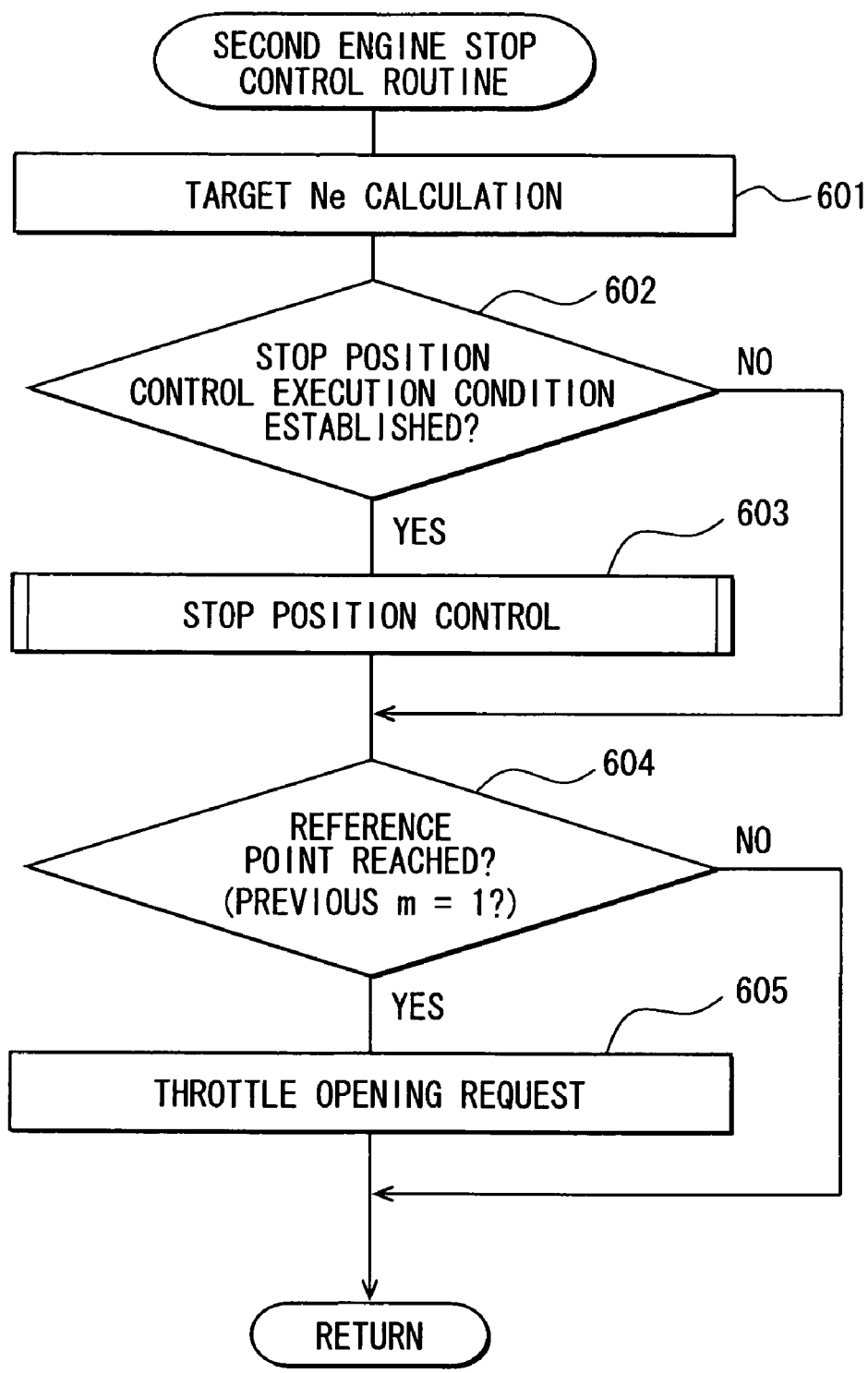
FIG. 10 is a flowchart illustrating a processing flow of a second engine stop control routine.

The second engine stop control routine shown in FIG. 10 is a subroutine executed in step 600 of the crank angle synchronization routine shown in FIG. 4. If the routine is started, first in step 601, the target Ne is calculated as follows.

First, target $Ne^2$ [M] in the interval (0 to $M_1$) of the first friction (Tfr1) and the interval ($M_1$ to M) of the second friction (Tfr2) is calculated by a following formula.

Target $Ne^2[M] = \{10/(\pi \cdot I)\} \times [0, 720Tfr1/N, (720Tfr1/N) \times 2, \ldots, (720Tfr1/N) \times M_1, (720Tfr2/N) \times (M_1+1), \ldots, (720Tfr2/N) \times (M-1)]$+reference point target $Ne^2$ Generally, because of the principle of energy conservation, a following relationship is established between the engine inertia moment I and the friction Tfr.

$(\frac{1}{2}) \cdot I \cdot \omega^2 = Tfr \cdot \ominus$ $\omega$ is angular speed [rad/s] and $\ominus$ is a rotational angle [rad].

$\omega = (2\pi/60) \cdot Ne$ $\ominus = (\pi/180) \cdot \theta$ $\theta$: rotational angle [deg]

A following formula is derived from the above relationship.

$$Ne^2 = (10/\pi \cdot I) \cdot Tfr \cdot \theta$$

The target $Ne^2$ [M] is calculated using the above relationship.

After the target $Ne^2$ [M] is calculated, "m" that satisfies a following expression is obtained ($0 \leq m \leq M$).

Target $Ne^2[m] - (\text{target } Ne^2[m] - \text{target } Ne^2[m-1])(1-\alpha) \leq$ actual $Ne^2 <$ target $Ne^2[m] + (\text{target } Ne^2[m+1] - \text{target } Ne^2[m])\alpha$ In the above expression, $0 \leq \alpha \leq 1$. "m" satisfying the above expression represents the position of the TDC, at which the control is performed currently (i.e., m-th TDC from reference point).

Then, the current target Ne is calculated from the target $Ne^2$ at the m-th TDC from the reference point by a following formula.

$$\text{Target } Ne = \sqrt{\text{target } Ne^2}$$

Accordingly, as the actual Ne decreases, the target Ne at each TDC is serially calculated based on the frictions Tfr1, Tfr2 and the reference point target Ne. Thus, the target trajectory is set.

After the current target Ne is calculated as above, the process proceeds to step 602, in which it is determined whether a stop position control execution condition is established, for example, based on whether both of following conditions (a), (b) are satisfied.

(a) The number of the TDCs after the fuel cut is equal to or larger than a predetermined value (for example, two).

(b) 1<m<another predetermined value (for example, 15). "m" is the TDC number to the reference point.

Figure 21:
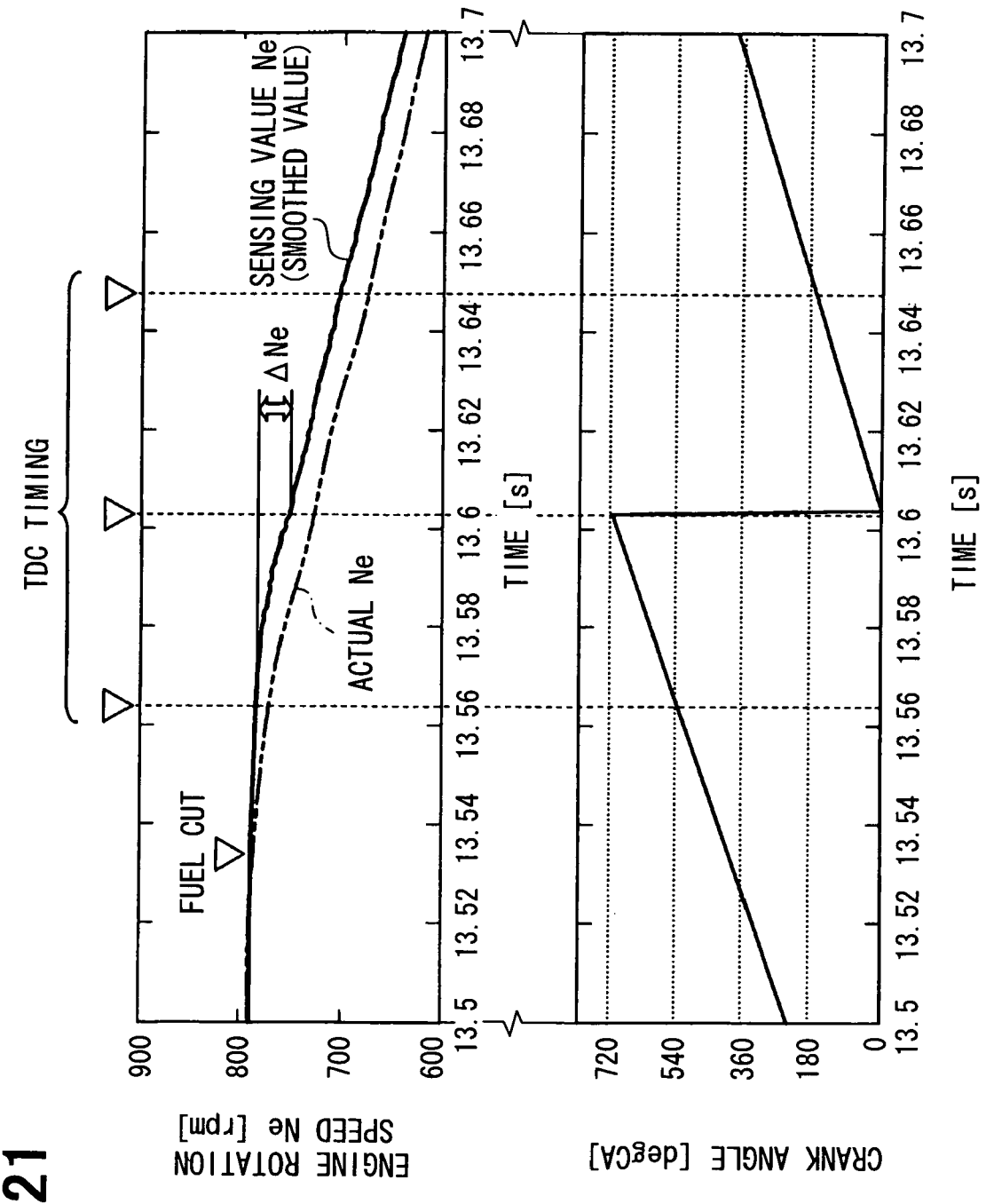
FIG. 21 is a time chart showing behaviors of a sensing value and an actual value of the engine rotation speed Ne and a sensing value of a crank angle immediately after a fuel cut (initial stage of engine stop behavior).

The above condition (a) is used for following reason. That is, as shown in FIG. 21, decrease width ΔNe of the engine rotation speed Ne becomes smaller than an actual value due to the smoothing processing of the engine rotation speed Ne, which is sensed from the output pulse of the crank angle sensor 28, immediately after the fuel cut (i.e., initial stage of engine stop behavior). Accordingly, the friction is estimated to be smaller than an actual value.

The above condition (b) is used because there is no need to start the stop position control from the TDC that is far from the reference point beyond necessity. In addition, it is difficult to perform the stop position control when the engine rotation speed is too high.

The stop position control execution condition is not established and the stop position control is not performed if at least either one of the conditions (a), (b) is not satisfied.

If both of the conditions (a), (b) are satisfied, the stop position control execution condition is established and the process proceeds to step 603, in which a stop position control routine shown in FIG. 11 explained later is executed to calculate the feedback correction torque Tfb of the request alternator torque.

Then, the process proceeds to step 604, in which it is determined whether the reference point is reached (i.e., whether previous m=1). If the reference point is not reached, the routine is ended as it is. If the reference point is reached, the process proceeds to step 605, in which the throttle opening request is outputted. Thus, the throttle opening is increased to the second predetermined value Ta2 larger than the first predetermined value Ta1.

Arbitrary throttle opening timing may be used as long as the opening timing is synchronized with the TDC. Therefore, it may be determined in step 604 whether previous m=2 (or 3, for example) and the throttle opening request may be outputted when the previous m=2 (or 3, for example). It suffices if the throttle opening is increased at the reference point or at the TDC slightly preceding the reference point.

[Stop Position Control Routine]

Figure 11:
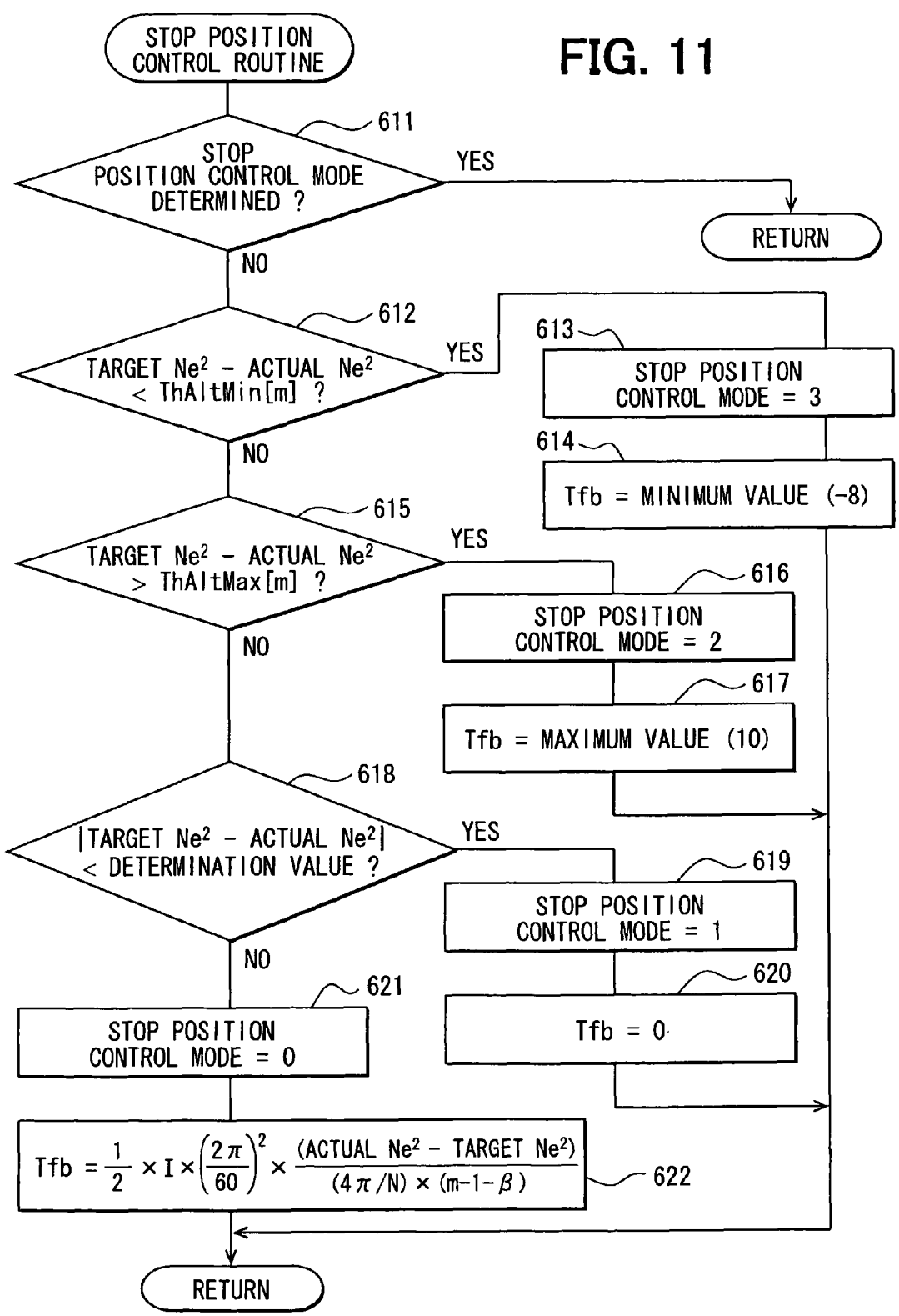
FIG. 11 is a flowchart illustrating a processing flow of a stop position control routine.

The stop position control routine shown in FIG. 11 is a subroutine executed in step 603 of the second engine stop control routine shown in FIG. 10. If the routine is started, first in step 611, it is determined whether a stop position control mode has been determined. If the stop position control mode has been determined, the routine is ended without performing subsequent processing.

Figure 17:
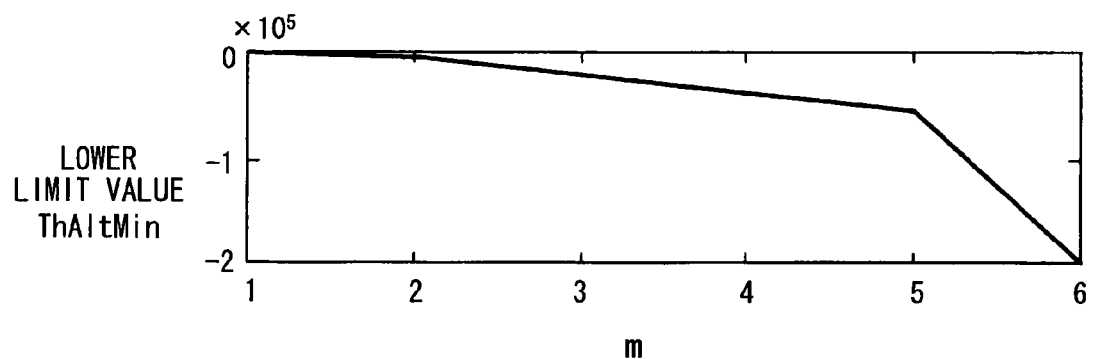
FIG. 17 is a diagram showing an example of a map of a lower limit value ThAltMin of a controllable energy deviation.

If the stop position control mode has not been determined yet, the process proceeds to step 612, in which it is determined whether a deviation (energy deviation) between the target $Ne^2$ and the actual $Ne^2$ is smaller than a lower limit value ThAltMin at the m-th TDC, at which the control is performed currently, with reference to a map of the lower limit value ThAltMin of the controllable energy deviation shown in FIG. 17. If it is determined that the deviation between the target $Ne^2$ and the actual $Ne^2$ is smaller than the lower limit value ThAltMin, the process proceeds to step 613, in which the stop position control mode is set to "3." In following step 614, the feedback correction torque Tfb of the request alternator torque is set to a minimum value (for example, −8).

Figure 18:
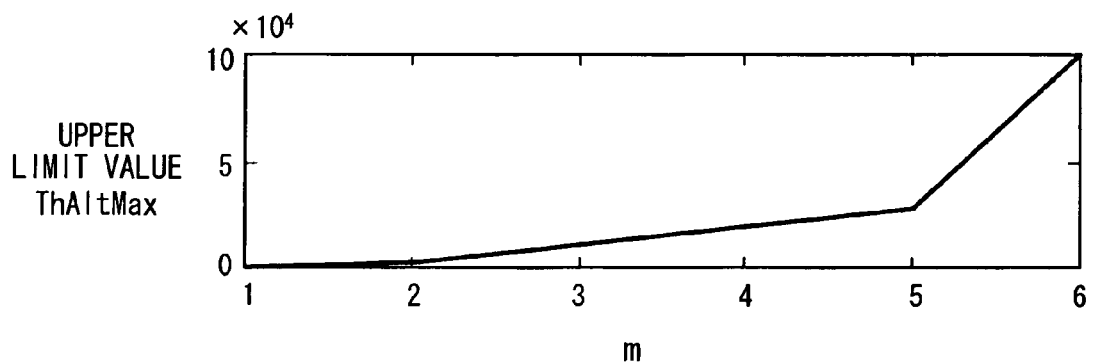
FIG. 18 is a diagram showing an example of a map of an upper limit value ThAltMax of the controllable energy deviation.

If it is determined in step 612 that the deviation between the target $Ne^2$ and the actual $Ne^2$ is equal to or larger than the lower limit value ThAltMin, the process proceeds to step 615, in which it is determined whether the deviation between the target $Ne^2$ and the actual $Ne^2$ is larger than an upper limit value ThAltMax at the m-th TDC, at which the control is performed currently, with reference to a map of the upper limit value ThAltMax of the controllable energy deviation shown in FIG. 18. If it is determined that the deviation between the target $Ne^2$ and the actual $Ne^2$ is larger than the upper limit value ThAltMax, the process proceeds to step 616, in which the stop position control mode is set to "2." Then, in following step 617, the feedback correction torque Tfb of the request alternator torque is set to a maximum value (for example, 10).

If it is determined that the deviation between the target $Ne^2$ and the actual $Ne^2$ is equal to or smaller than the upper limit value ThAltMax, the process proceeds to step 618, in which it is determined whether an absolute value of the deviation between the target $Ne^2$ and the actual $Ne^2$ (i.e., |target $Ne^2$−actual $Ne^2$|) is smaller than a determination value (for example, 5000). When the absolute value |target $Ne^2$−actual $Ne^2$| is smaller than the determination value, the deviation between the target $Ne^2$ and the actual $Ne^2$ is small. Therefore, in this case, it is determined that there is no need to perform the feedback control of the torque of the alternator 33 and the process proceeds to step 619, in which the stop position control mode is set to "1." Then, in following step 620, the feedback correction torque Tfb of the request alternator torque is set to 0. Thus, the first and second frictions (Tfr1, Tfr2) can be learned in a state where the torque of the alternator 33 is fixed at the offset torque Tofs (i.e., in a state where feedback control is prohibited) over an entire range of the engine rotation stop behavior.

If it is determined that |target $Ne^2$−actual $Ne^2$| is equal to or larger than the determination value, it is determined that the present state is in the feedback control range, and the process proceeds to step 621, in which the stop position control mode is set to "0." Then, in following step 622, the feedback cor rection torque Tfb of the request alternator torque is calculated by a following formula.

$$Tfb = (1/2) \times I \times (2\pi/60)^2 \times (\text{actual } Ne^2 - \text{target } Ne^2) \div \{(4\pi/N) \times (m-1-\beta)\}$$

In the above formula, $\beta$ represents an adjustment parameter for calculating the crank angle from the reference point to a position where the generation of the torque of the alternator 33 ceases ($0 \leq \beta \leq 1$).

As shown in FIG. 22, the generation of the torque of the alternator 33 ceases at a position preceding the reference point by a predetermined crank angle $[(4\pi/N) \times \beta]$. Therefore, the feedback correction torque Tfb is calculated such that the deviation (energy deviation) between the target $Ne^2$ and the actual $Ne^2$ becomes zero at the position preceding the reference point by the predetermined crank angle $[(4\pi/N) \times \beta]$ with the use of the above formula. In this case, the position preceding the reference point by the predetermined crank angle $[(4\pi/N) \times \beta]$ is set at a position where the actual Ne coincides with the lower limit rotation speed of the torque generation rotation speed range of the alternator 33. Alternatively, the position may be set at a position where the actual Ne becomes rotation speed slightly higher than the lower limit rotation speed of the torque generation rotation speed range of the alternator 33.

The stop position control mode is determined based on the deviation (energy deviation) between, the target $Ne^2$ and the actual $Ne^2$ at the start of the stop position control by the processing of the above-described stop position control routine. Based on the determination result, the feedback correction torque Tfb of the request alternator torque is set as follows.

(A) When the deviation between the target $Ne^2$ and the actual $Ne^2$ is smaller than the lower limit value ThAltMin of the controllable energy deviation, the stop position control mode is set to "3" and the feedback correction torque Tfb of the request alternator torque is set to the minimum value (for example, −8).

(B) When the deviation between the target $Ne^2$ and the actual $Ne^2$ is larger than the upper limit value ThAltMax of the controllable energy deviation, the stop position control mode is set to "2" and the feedback correction torque Tfb of the request alternator torque is set to the maximum value (for example, 10).

By fixing the feedback correction torque Tfb of the request alternator torque at the maximum value or the minimum value when the deviation between the target $Ne_2$ and the actual $Ne^2$ exceeds the upper limit value or the lower limit value of the controllable energy deviation as in above (A) or (B), the control can be performed also in a range where the control cannot be performed by the feedback control.

(C) When |target $Ne^2$−actual $Ne^2$| is smaller than the determination value, the deviation between the target $Ne^2$ and the actual $Ne^2$ is small. Therefore, in this case, it is determined that the feedback control of the torque of the alternator 33 is unnecessary. In this case, the stop position control mode is set to "1" and the feedback correction torque Tfb of the request alternator torque is set to 0. Thus, the first and second frictions (Tfr1, Tfr2) can be learned in a state where the feedback control of the torque of the alternator 33 is prohibited over the entire range of engine rotation stop behavior.

(D) In the other case than the above, it is determined that the present state is in the feedback control range. In this case, the stop position control mode is set to "0" and the feedback correction torque Tfb of the request alternator torque is calculated.

[First Engine Start Control Routine]

Figure 12:
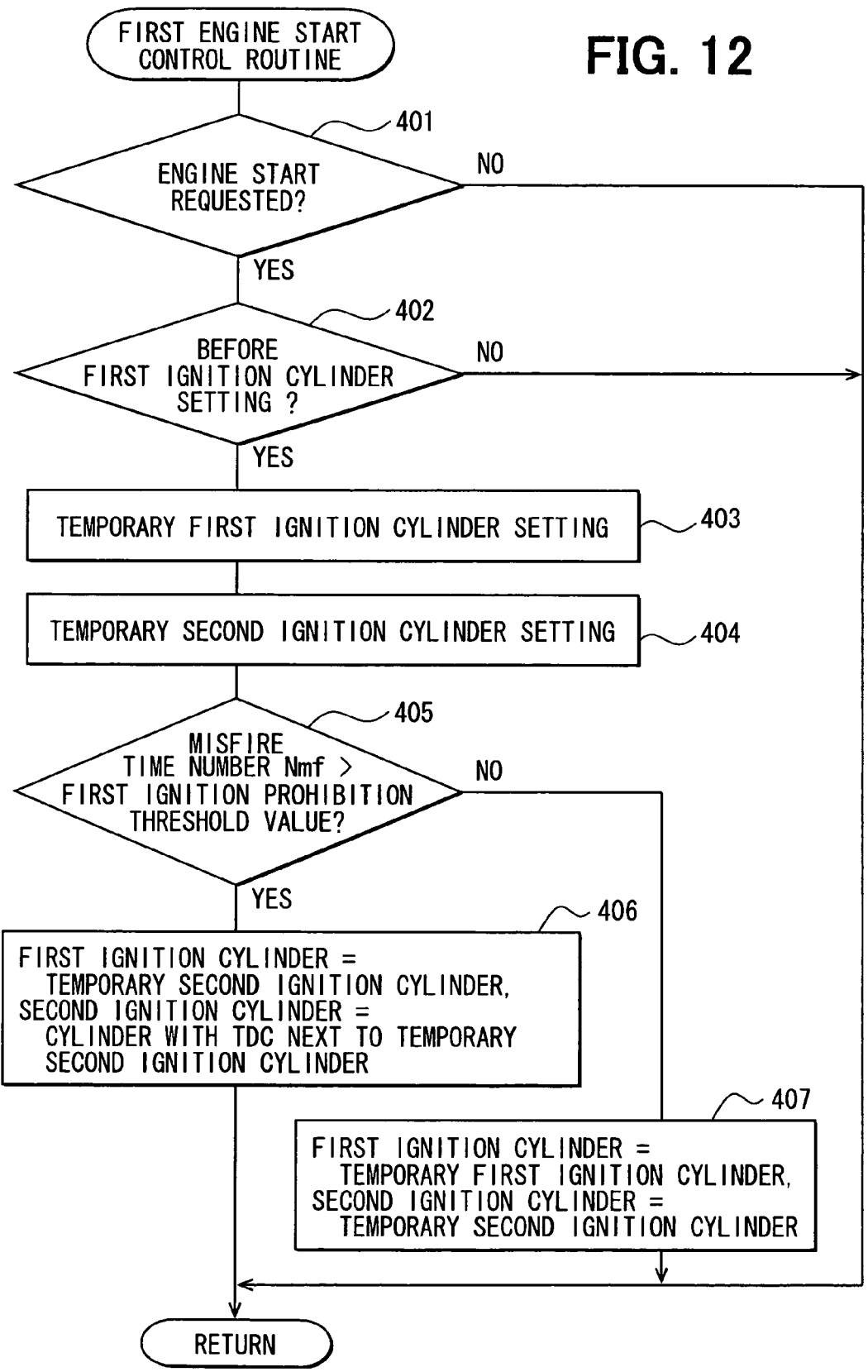
FIG. 12 is a flowchart illustrating a processing flow of a first engine start control routine.

The first engine start control routine shown in FIG. 12 is a subroutine executed in step 400 of the time synchronization routine shown in FIG. 3 and functions as a first ignition cylinder setting means of the claims. If the routine is started, first in step 401, it is determined whether the engine start is requested based on the processing result of the engine start request determination routine of FIG. 6. If the engine start is not requested, the routine is ended as it is.

If the engine start is requested, the process proceeds to step 402, in which it is determined whether the first ignition cylinder for performing the ignition first in the automatic start has not been set. If the first ignition cylinder has been already set, the routine is ended without performing subsequent processing.

If it is determined that the first ignition cylinder has not been set yet, the process proceeds to step 403, in which a temporary first ignition cylinder corresponding to the crank angle of the stop position is set with reference to a first ignition cylinder map shown in FIG. 13 (in the case of four-cylinder engine). In the present embodiment, the stop position can be controlled to the target stop position with high accuracy. Therefore, the crank angle of the target stop position may be used as the crank angle of the stop position. Then, the process proceeds to step 404. In step 404, a cylinder, in which the TDC is reached next to the temporary first ignition cylinder, is set as a temporary second ignition cylinder.

Then, the process proceeds to step 405, in which it is determined whether a misfire time number Nmf of the temporary first ignition cylinder sensed by a second engine start control routine of FIG. 14 explained later is larger than a first ignition prohibition threshold value. If the misfire time number Nmf of the temporary first ignition cylinder is larger than the first ignition prohibition threshold value, the process proceeds to step 406, in which the temporary second ignition cylinder is set as the first ignition cylinder and a cylinder, in which the TDC is reached next to the temporary second ignition cylinder, is set as the second ignition cylinder. In this case, the fuel supply to the temporary first ignition cylinder is prohibited.

If it is determined in step 405 that the misfire time number Nmf of the temporary first ignition cylinder is equal to or smaller than the first ignition prohibition threshold value, the process proceeds to step 407, in which the temporary first ignition cylinder is set as the first ignition cylinder as it is and the temporary second ignition cylinder is set as the second ignition cylinder as it is. The processing of steps 405 to 407 functions as an automatic start control means of the claims.

[Second Engine Start Control Routine]

Figure 14:
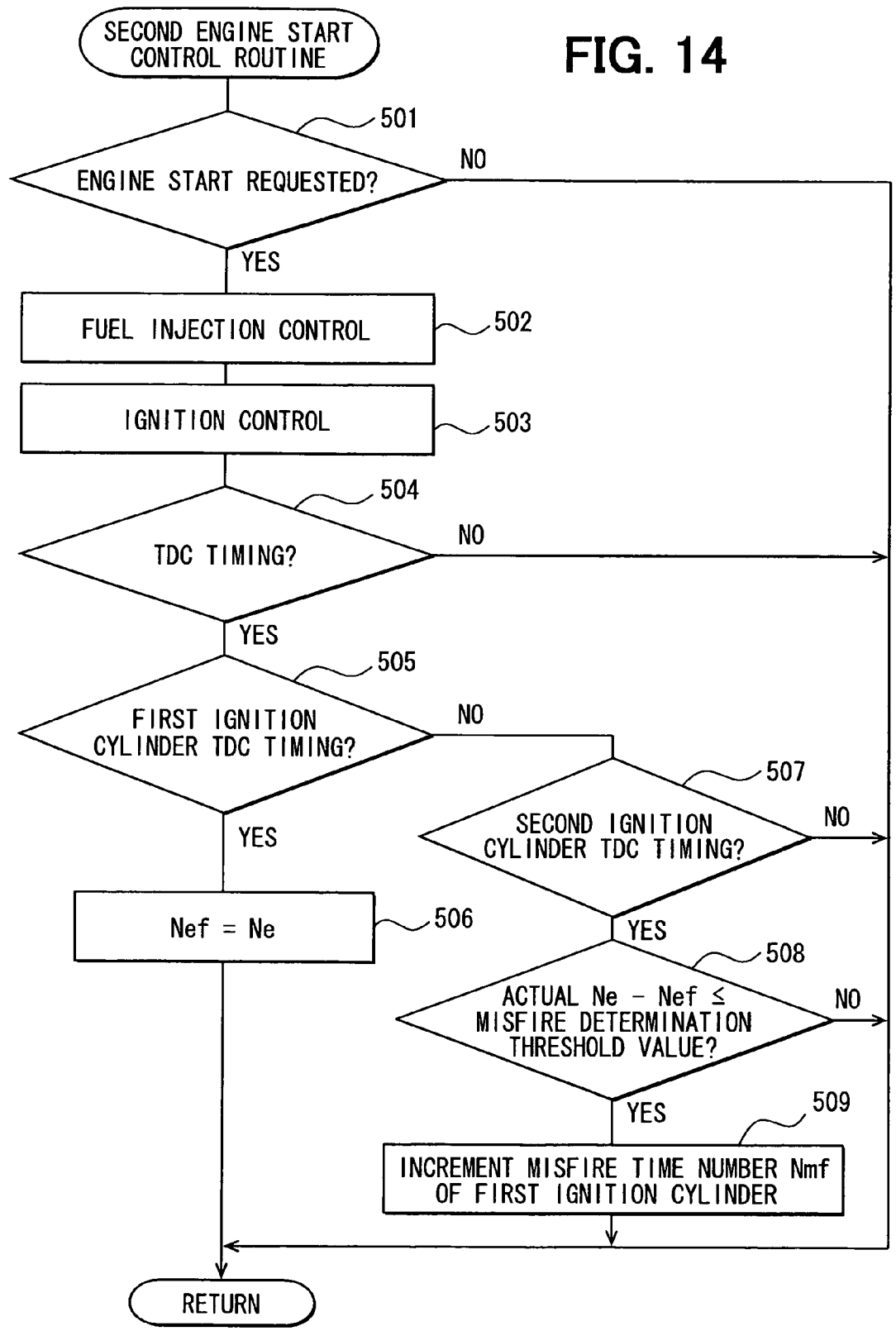
FIG. 14 is a flowchart illustrating a processing flow of a second engine start control routine.

The second engine start control routine shown in FIG. 14 is a subroutine executed in step 500 of the crank angle synchronization routine shown in FIG. 4. If the routine is started, first in step 501, it is determined whether the engine start is requested based on the processing result of the engine start request determination routine of FIG. 6. If the engine start is not requested, the routine is ended as it is.

If the engine start is requested, the process proceeds to step 502, in which fuel injection control is performed. In following step 503, ignition control is performed.

Then, the process proceeds to step 504, in which it is determined whether the present time is the TDC timing. If the present time is not the TDC timing, the routine is ended as it is. If the present time is the TDC timing, the process proceeds to step 505, in which it is determined whether the present time is the TDC timing of the first ignition cylinder. If the present time is the TDC timing of the first ignition cylinder, the process proceeds to step 506, in which the actual Ne at the TDC timing of the first ignition cylinder is stored as Nef in the memory of the ECU 30 (RAM or the like).

If it is determined in step 505 that the present time is not the TDC timing of the first ignition cylinder, the process proceeds to step 507, in which it is determined whether the present time is TDC timing of the second ignition cylinder. If the present time is not the TDC timing of the second ignition cylinder, the routine is ended as it is.

Thereafter, when the TDC timing of the second ignition cylinder is reached, the process proceeds to step 508, in which it is determined whether a deviation ΔNe (=actual Ne−Nef) between the actual Ne at the TDC timing of the second ignition cylinder and the rotation speed Nef at the TDC timing of the first ignition cylinder stored in the memory is "equal to or smaller than" a misfire determination threshold value. Thus, it is determined whether the first ignition cylinder has caused the misfire.

Figure 19:
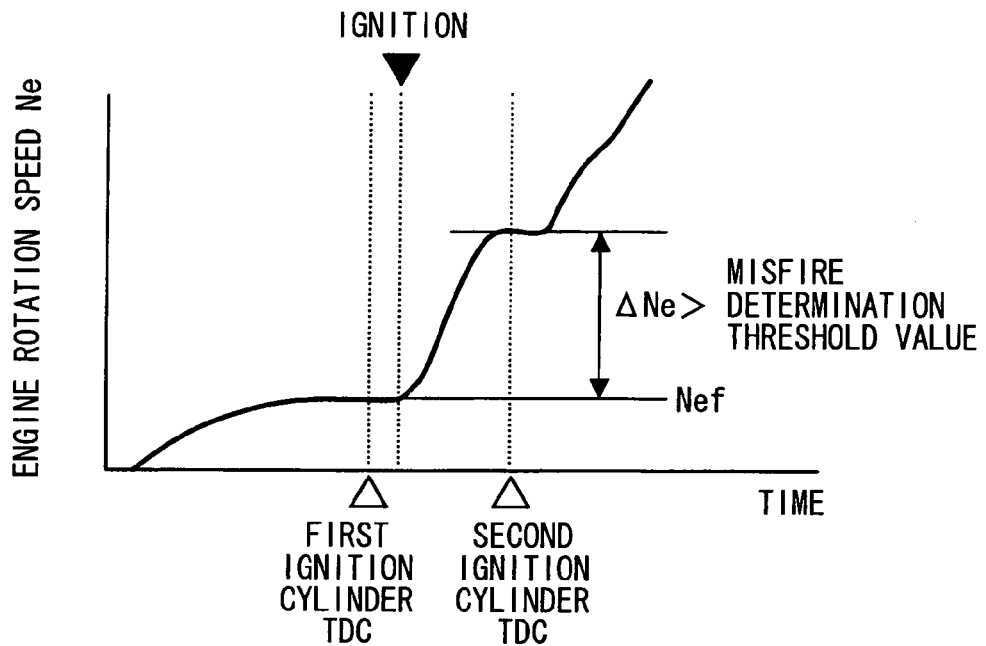
FIG. 19 is a time chart showing an example of a behavior of engine rotation speed Ne at the time when a first ignition cylinder causes normal combustion.
Figure 20:
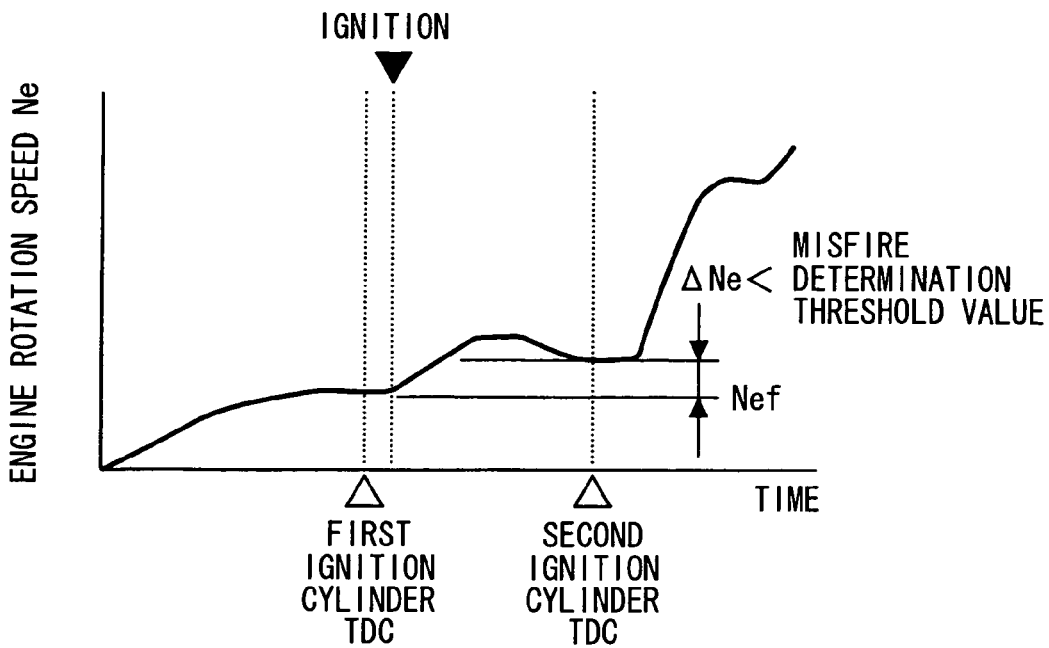
FIG. 20 is a time chart showing an example of a behavior of the engine rotation speed Ne at the time when the first ignition cylinder causes a misfire.

If the normal combustion occurs in the first ignition cylinder, the actual Ne increases suddenly and the deviation ΔNe between the actual Ne at the TDC timing of the second ignition cylinder and the actual Ne (=Nef) at the TDC timing of the first ignition cylinder increases as shown in FIG. 19. If the misfire occurs in the first ignition cylinder, the actual Ne does not increase significantly as shown in FIG. 20. Therefore, the deviation ΔNe between the actual Ne at the TDC timing of the second ignition cylinder and the actual Ne (=Nef) at the TDC timing of the first ignition cylinder is much smaller than in the case of the normal combustion. Based on such the characteristic, when the deviation ΔNe is equal to or smaller than the misfire determination threshold value, it is determined that the first ignition cylinder has caused a misfire and the process proceeds to step 509. In step 509, a misfire time number counter that counts the misfire time number Nmf of the first ignition cylinder is incremented. The misfire time number counter is provided for each cylinder. For each cylinder, the misfire time number counter of the cylinder counts the misfire time number Nmf at the time when the cylinder is the first ignition cylinder. The misfire time number Nmf is stored in the memory of the ECU 30 (the RAM, the backup RAM or the like) for each cylinder.

If the deviation ΔNe is larger than the misfire determination threshold value, it is determined that the first ignition cylinder has caused the normal combustion. The processing of steps 504 to 509 functions as a misfire determination means of the claims.

FIG. 15 is a time chart showing an example of the engine stop control according to the present embodiment described above. In the control example, when the engine stop request is outputted (ON), the engine rotation speed Ne is lower than the predetermined value Ne1 necessary for conforming the engine rotation behavior to the target trajectory. Therefore, the ignition timing is advanced to increase the engine torque, and the compressor OFF flag is set at ON to stop the compressor and to reduce the load on the engine 11. Thus, the engine rotation speed Ne is increased.

In this way, when the engine rotation speed Ne exceeds the predetermined value Ne1, the fuel cut flag is set at ON to perform the fuel cut, and the throttle opening is increased from the idle speed control opening to the first predetermined value Ta1. Thereafter, when the stop position control execution condition is established, the stop position control is started and the request alternator torque is set based on the offset torque Tofs and the feedback correction torque Tfb.

Request alternator torque=*Tofs*+*Tfb*

At that time, the generation of the torque of the alternator 33 ceases at the position preceding the reference point by the predetermined crank angle $[(4\pi/N)\times\beta]$. Therefore, the feedback correction torque Tfb is calculated such that the deviation (energy deviation) between the target trajectory and the engine rotation behavior becomes zero at the position preceding the reference point by the predetermined crank angle $[(4\pi/N)\times\beta]$. Thus, the engine rotation behavior coincides with the target trajectory at the position preceding the reference point by the predetermined crank angle $[(4\pi/N)\times\beta]$ as shown in FIG. 22.

Thereafter, the request alternator torque becomes zero when the establishment of the stop position control execution condition fails. Further, the throttle opening is increased from the first predetermined value Ta1 to the second predetermined value Ta2 when the reference point is reached. Thereafter, when a predetermined time elapses after the engine rotation speed Ne decreases to or under the rotation speed Ne2 immediately preceding the stop, the next reference point target Ne is learned based on the stop position error and the frictions Tfr1, Tfr2 are learned.

The influence of the compression arises in a very low rotation range immediately before the engine rotation stops. Therefore, in the present embodiment, the target trajectory (target Ne at respective TDCs) extending to the target Ne at the reference point set at the position preceding the target stop position by a predetermined crank angle is set. Thus, the target trajectory can be set in the range preceding the very low rotation range in which the influence of the compression arises. Thus, the engine rotation behavior can be controlled with the torque of the alternator 33 without being affected by the compression during the engine rotation stop behavior.

In consideration of the phenomenon that the generation of the torque of the alternator 33 ceases immediately before the reference point, the torque of the alternator 33 is controlled such that the deviation (energy deviation) between the target trajectory and the engine rotation behavior becomes zero at the position preceding the reference point by the predetermined crank angle $[(4\pi/N)\times\beta]$ in the present embodiment. Therefore, the engine rotation behavior can be accurately conformed to the target trajectory with the torque of the alternator 33 by using the range where the torque of the alternator 33 can be efficiently controlled before the reference point is reached. Thus, the actual Ne can be conformed to the target Ne with high accuracy at the reference point. The target Ne at the reference point is set to the engine rotation speed at the reference point necessary for stopping the engine rotation at the target stop position from the reference point. That is, the setting is made such that the target stop position is located on an extended line of the target trajectory extending to the reference point. Therefore, as the actual Ne can be accurately conformed to the target Ne at the reference point by the control according to the present embodiment, the actual stop position of the engine rotation can be conformed to the target stop position with high accuracy.

According to the present embodiment, the target Ne at the reference point is set to be equal to or lower than the lower limit rotation speed of the rotation speed range in which the torque of the alternator 33 is generated. Thus, the influence of the torque of the alternator 33 on the engine rotation behavior from the reference point to the target stop position does not occur, so the error in the stop position due to the torque of the alternator 33 can be eliminated.

The position preceding the reference point by the predetermined crank angle $[(4\pi/N)\times\beta]$ (i.e., position where energy deviation between target trajectory and engine rotation behavior becomes zero) is set at the position where the engine rotation speed becomes the lower limit rotation speed of the torque generation rotation speed range of the alternator 33. Therefore, the engine rotation behavior can be conformed to the target trajectory with high accuracy by using the rotation speed range, in which the torque of the alternator 33 can be outputted efficiently, as efficiently as possible.

In the present embodiment, when the energy deviation at the start of the engine stop control is larger than the upper limit value ThAltMax of the controllable energy deviation, the engine stop control is performed by fixing the feedback correction torque Tfb of the alternator 33 at the maximum value. When the energy deviation at the start of the engine stop control is smaller than the lower limit value ThAltMin of the controllable energy deviation, the engine stop control is performed by fixing the feedback correction torque Tfb of the alternator 33 at the minimum value. Accordingly, when it is determined that the energy deviation at the start of the engine stop control exceeds the capacity of the engine stop control, the engine stop control can be performed by fixing the feedback correction torque Tfb at the maximum value or the minimum value. Thus, the control can be performed also in the range, where the control cannot be performed by the feedback control.

In the present embodiment, when the absolute value of the energy deviation at the start of the engine stop control is smaller than the determination value, the engine stop control is performed by fixing the feedback correction torque Tfb at the constant value "zero," and the engine friction is leaned based on the engine rotation behavior during the engine stop control. Therefore, when it is determined that there is no need to perform the feedback control of the torque of the alternator 33 because the absolute value of the energy deviation at the start of the engine stop control is small, the feedback control is prohibited and the engine friction can be learned based on the engine rotation behavior. Thus, the engine friction can be learned with high accuracy without being affected by the feedback control.

The setting is made such that the target stop position is located on the extended line of the target trajectory extending to the reference point. Therefore, it is thought that the error in the stop position is caused by the error in the target Ne at the reference point (error in target trajectory). In consideration of this point, in the present embodiment, the target Ne at the reference point is learned and corrected based on the error in the stop position. Accordingly, the accuracy of the target Ne at the reference point can be improved.

In the engine stop process, cylinder pressure of each cylinder operates in a direction to hinder the engine rotation (i.e., direction in which kinetic energy decreases) in a compression stroke and operates in a direction to help the engine rotation (i.e., direction in which kinetic energy increases) in an expansion stroke. Therefore, balance of the kinetic energy due to the cylinder pressure becomes zero for each TDC. Paying attention to this point, according to the present embodiment, the target trajectory is set for each TDC. Therefore, the target trajectory can be set with high accuracy by eliminating the influence of cyclic change of the kinetic energy due to the cylinder pressure, and the calculation for setting the target trajectory can be simplified.

The present invention is not limited to the construction that sets the target trajectory for each TDC. Alternatively, the target trajectory may be set for each predetermined crank angle interval.

In the present embodiment, the engine stop position in the automatic stop can be controlled to the target stop position with high accuracy. Therefore, it can be estimated that the engine stop position immediately before the automatic start is the target stop position. In consideration of this point, according to the present embodiment, the first ignition cylinder is set based on the engine rotation stop position (=target stop position) in the automatic start. The existence/nonexistence of the misfire in the first ignition cylinder is determined based on whether the difference between the engine rotation speed at the TDC of the first ignition cylinder and the engine rotation speed at the TDC of the second ignition cylinder is equal to or lower than the predetermined misfire determination threshold value. Accordingly, it can be accurately determined whether the first ignition cylinder has caused the misfire in the automatic start.

When the misfire time number of the first ignition cylinder exceeds a predetermined value, the fuel supply to the first ignition cylinder is prohibited and the automatic start is started from the second ignition cylinder. Therefore, when the misfire time number of the first ignition cylinder exceeds the predetermined value, the automatic start can be started by changing the second ignition cylinder into the first ignition cylinder. Therefore, the occurrence of the misfire at the first ignition in the automatic start can be precluded.

In the present embodiment, the engine rotation speed is sensed at the both TDCs of the first and second ignition cylinders. Alternatively, the engine rotation speed may be sensed at a predetermined crank angle set in an interval from timing immediately before the ignition to timing immediately after the ignition of the first ignition cylinder and may be sensed at a predetermined crank angle set before the ignition of the second ignition cylinder.

In this case, it is thought that the engine rotation speed in the interval from the timing immediately before the ignition to the timing immediately after the ignition of the first ignition cylinder is close to cranking rotation speed achieved by the starter. Therefore, the existence/nonexistence of the misfire in the first ignition cylinder may be determined based on whether the engine rotation speed at a predetermined crank angle after the ignition of the first ignition cylinder and before the ignition of the second ignition cylinder is "equal to or lower than" a predetermined misfire determination threshold value. The misfire determination threshold value in this case may be set at a value larger than the misfire determination threshold value of the present embodiment by an amount corresponding to the cranking rotation speed. Thus, like the present embodiment, it can be accurately determined whether the first ignition cylinder has caused the misfire in the automatic start.

In the present embodiment, the fuel supply to the first ignition cylinder is prohibited and the automatic start is started from the second ignition cylinder when the misfire time number of the first ignition cylinder exceeds the predetermined value. Alternatively, the fuel supply to the first ignition cylinder may be prohibited and the automatic start may be started from the second ignition cylinder when misfire frequency of the first ignition cylinder (ratio of misfire time number to total ignition time number) exceeds a predetermined value.

In the present embodiment, the torque of the alternator 33 is controlled during the engine stop control. Alternatively, other electric machinery than the alternator 33 (e.g., motor generator of hybrid vehicle) may be controlled.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An engine automatic stop-start controller that automatically stops an engine when a predetermined automatic stop condition is established and then automatically starts the engine when a predetermined automatic start condition is established, the engine automatic stop-start controller comprising:
   a first ignition cylinder setting means for setting a first ignition cylinder that performs ignition first based on an engine stop position in the automatic start; and
   a misfire determination means for determining existence or nonexistence of a misfire in the first ignition cylinder based on whether a difference between engine rotation speed at a predetermined crank angle in an interval from timing immediately before the ignition to timing immediately after the ignition of the first ignition cylinder and engine rotation speed at a predetermined crank angle before ignition of a second ignition cylinder is equal to or lower than a predetermined misfire determination threshold value.

2. The engine automatic stop-start controller as in claim 1, further comprising:
   an automatic start control means for prohibiting fuel supply to the first ignition cylinder and for starting the automatic start from the second ignition cylinder when misfire time number or misfire frequency of the first ignition cylinder sensed by the misfire determination means exceeds a predetermined value.

3. The engine automatic stop-start controller as in claim 2, wherein
   the misfire determination means counts the misfire time number or the misfire frequency at the time when each cylinder is the first ignition cylinder for each cylinder and stores the misfire time number or the misfire frequency in a memory for each cylinder.

4. An engine automatic stop-start controller that automatically stops an engine when a predetermined automatic stop condition is established and then automatically starts the engine when a predetermined automatic start condition is established, the engine automatic stop-start controller comprising:
   a first ignition cylinder setting means for setting a first ignition cylinder that performs ignition first based on an engine stop position in the automatic start; and
   a misfire determination means for determining existence or nonexistence of a misfire in the first ignition cylinder based on whether engine rotation speed at a predetermined crank angle after the ignition of the first ignition cylinder and before ignition of a second ignition cylinder is equal to or lower than a predetermined misfire determination threshold value.

5. The engine automatic stop-start controller as in claim 4, further comprising:
   an automatic start control means for prohibiting fuel supply to the first ignition cylinder and for starting the automatic start from the second ignition cylinder when misfire time number or misfire frequency of the first ignition cylinder sensed by the misfire determination means exceeds a predetermined value.

6. The engine automatic stop-start controller as in claim 5, wherein
   the misfire determination means counts the misfire time number or the misfire frequency at the time when each cylinder is the first ignition cylinder for each cylinder and stores the misfire time number or the misfire frequency in a memory for each cylinder.

* * * * *